United States Patent
Kita et al.

(10) Patent No.: US 10,192,493 B2
(45) Date of Patent: Jan. 29, 2019

(54) DISPLAY DEVICE

(71) Applicant: Sharp Kabushiki Kaisha, Sakai, Osaka (JP)

(72) Inventors: Yuichi Kita, Sakai (JP); Yoshiki Nakatani, Sakai (JP); Iori Aoyama, Sakai (JP); Takahiro Sasaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 16 days.

(21) Appl. No.: 15/316,861

(22) PCT Filed: Jun. 9, 2015

(86) PCT No.: PCT/JP2015/066565
§ 371 (c)(1),
(2) Date: Dec. 7, 2016

(87) PCT Pub. No.: WO2015/190461
PCT Pub. Date: Dec. 17, 2015

(65) Prior Publication Data
US 2017/0103716 A1    Apr. 13, 2017

(30) Foreign Application Priority Data

Jun. 13, 2014  (JP) .................................. 2014-122444

(51) Int. Cl.
*G09G 3/34* (2006.01)
*G02F 1/133* (2006.01)
(Continued)

(52) U.S. Cl.
CPC ........... *G09G 3/3413* (2013.01); *G02F 1/133* (2013.01); *G02F 1/1333* (2013.01);
(Continued)

(58) Field of Classification Search
CPC .. G02F 1/133; G02F 1/1333; G02F 1/133621; G02F 1/1343; G02F 1/134363; G02F 2001/133622; G02F 2001/134372; G02F 2203/01; G02F 2203/64; G02F 2203/66; G09G 3/001; G09G 3/2003; G09G 3/3413; G09G 2300/0456; G09G 2310/0235
See application file for complete search history.

(56) References Cited

U.S. PATENT DOCUMENTS 6,072,914 A * 6/2000 Mikuni .................. G06T 11/00
                                                            358/540
2005/0024548 A1   2/2005 Choi et al.
(Continued)

FOREIGN PATENT DOCUMENTS

JP   2002-365657 A   12/2002
JP   2006-523850 A   10/2006
(Continued)

OTHER PUBLICATIONS

Official Communication issued in International Patent Application No. PCT/JP2015/066565, dated Aug. 25, 2015.

*Primary Examiner* — Stacy Khoo
(74) *Attorney, Agent, or Firm* — Keating & Bennett, LLP

(57) ABSTRACT

A display device (100) includes: a display panel (1) capable of being in a transparent display state where a background scene is viewable through the display panel; a panel light source (3) that irradiates the display panel with colored light of a plurality of colors in a time division manner; a rear side light source (2) placed on a rear surface side of the display panel, the rear side light source being capable of emitting colored light of a plurality of colors in a time division manner; and a control circuit that controls emission timings of the colored light from the panel light source and from the rear side light source, wherein the panel light source and the rear side light source are synchronized by the control circuit such that colored light of different colors are not emitted at a same timing.

15 Claims, 14 Drawing Sheets

(51) Int. Cl.
    *G02F 1/1333*    (2006.01)
    *G02F 1/1343*    (2006.01)
    *G02F 1/1335*    (2006.01)
    *G09G 3/20*      (2006.01)
    *G09G 3/00*      (2006.01)

(52) U.S. Cl.
    CPC ...... G02F 1/1343 (2013.01); G02F 1/133621 (2013.01); G02F 1/134363 (2013.01); G09G 3/001 (2013.01); G09G 3/2003 (2013.01); G02F 2001/133622 (2013.01); G02F 2001/134372 (2013.01); G02F 2203/01 (2013.01); G02F 2203/64 (2013.01); G02F 2203/66 (2013.01); G09G 2300/0456 (2013.01); G09G 2310/0235 (2013.01); G09G 2320/064 (2013.01); G09G 2380/00 (2013.01)

(56) References Cited

U.S. PATENT DOCUMENTS

| | | | | |
|---|---|---|---|---|
| 2008/0259099 A1* | 10/2008 | Arai | ...... | G09G 3/2003 345/690 |
| 2009/0091513 A1* | 4/2009 | Kuhn | ...... | G09F 9/33 345/4 |
| 2009/0115711 A1* | 5/2009 | Ueyama | ...... | G02B 6/0068 345/87 |
| 2009/0290096 A1* | 11/2009 | Yoon | ...... | G02B 6/0036 349/65 |
| 2010/0025722 A1* | 2/2010 | Wada | ...... | H01L 33/486 257/99 |
| 2011/0037924 A1* | 2/2011 | Kido | ...... | G02F 1/1326 349/63 |
| 2011/0109527 A1* | 5/2011 | Kitamori | ...... | G02F 1/1323 345/4 |
| 2011/0267382 A1* | 11/2011 | Fergason | ...... | G02F 1/1336 345/690 |
| 2012/0140147 A1 | 6/2012 | Satoh et al. | | |
| 2012/0300142 A1* | 11/2012 | Kim | ...... | G02F 1/13338 349/15 |
| 2014/0111561 A1 | 4/2014 | Iyama et al. | | |
| 2014/0132906 A1* | 5/2014 | Yoshioka | ...... | G02F 1/134309 349/141 |

FOREIGN PATENT DOCUMENTS

| | | | | |
|---|---|---|---|---|
| JP | WO 2013001980 A1 * | 1/2013 | ......... | G02F 1/34309 |
| WO | 2011/043100 A1 | 4/2011 | | |
| WO | 2013/001979 A1 | 1/2013 | | |
| WO | 2014/109026 A1 | 7/2014 | | |

* cited by examiner

FIG.2
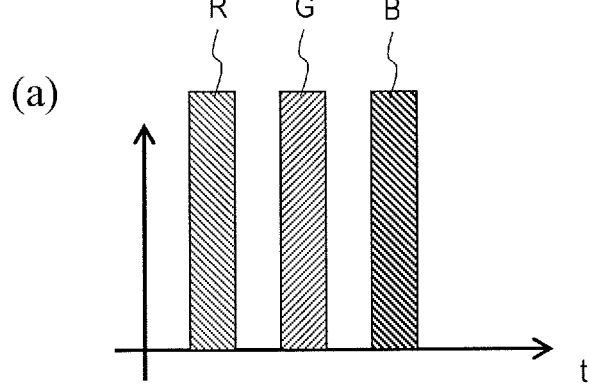
(a)
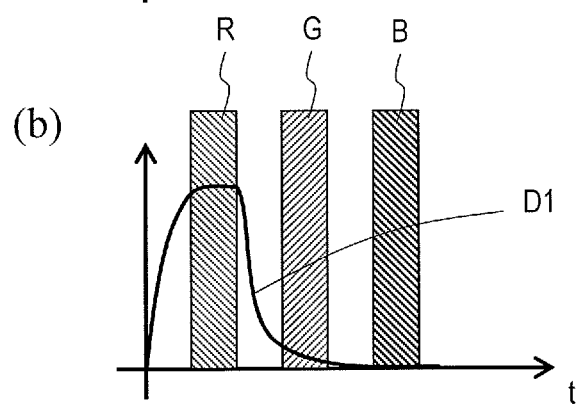
(b)
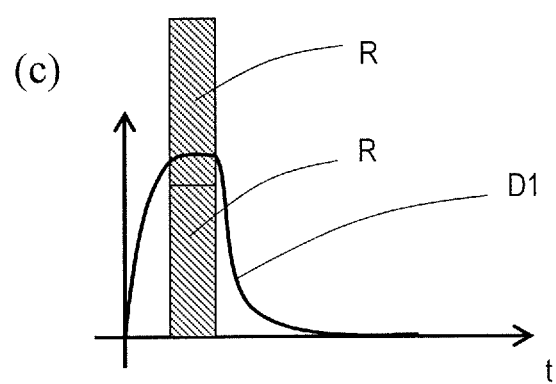
(c)

FIG.3
(a) 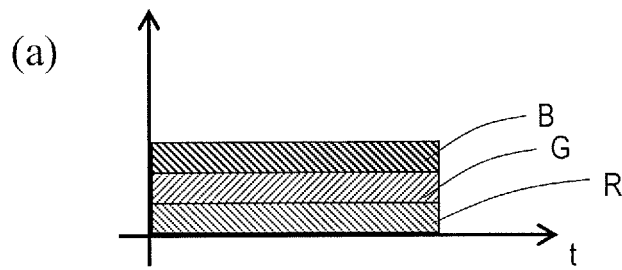
(b) 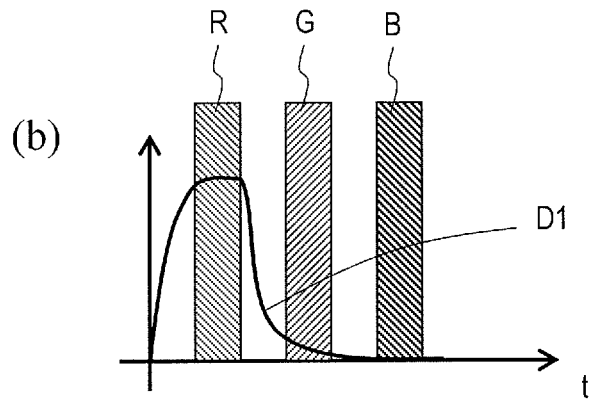
(c) 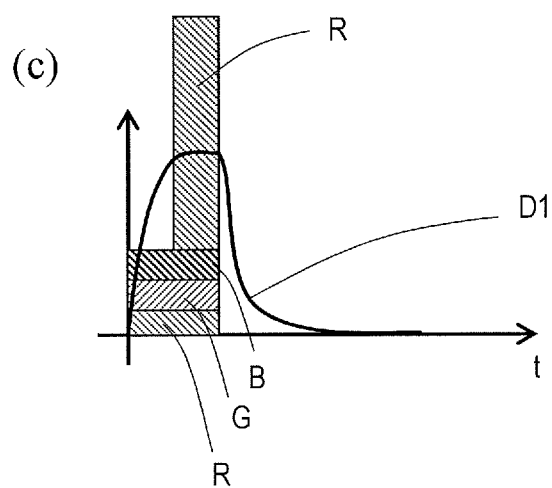

FIG.4
(a)
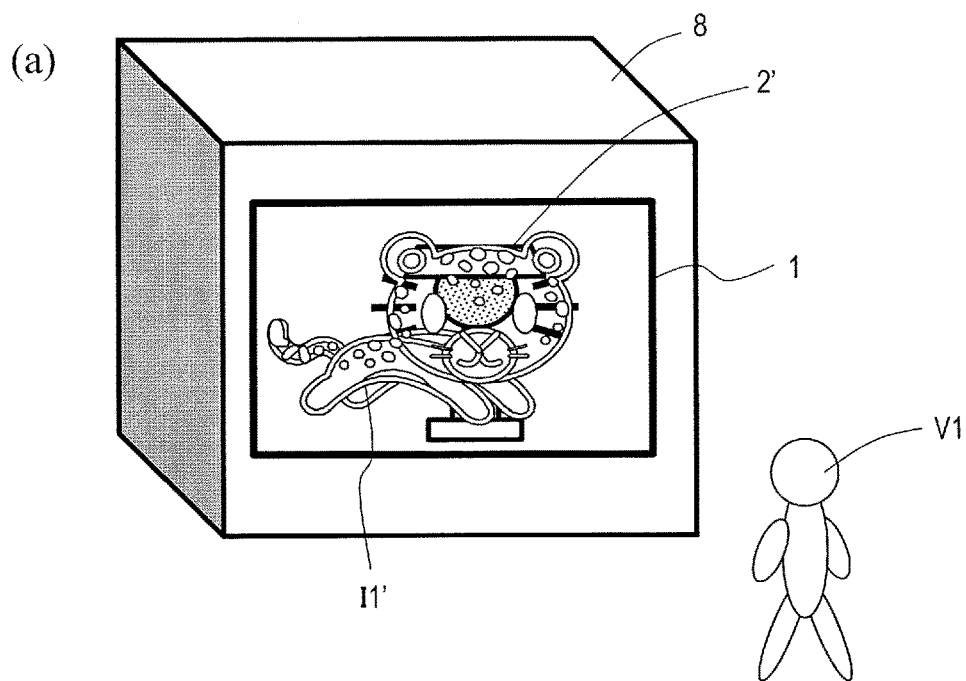
(b)
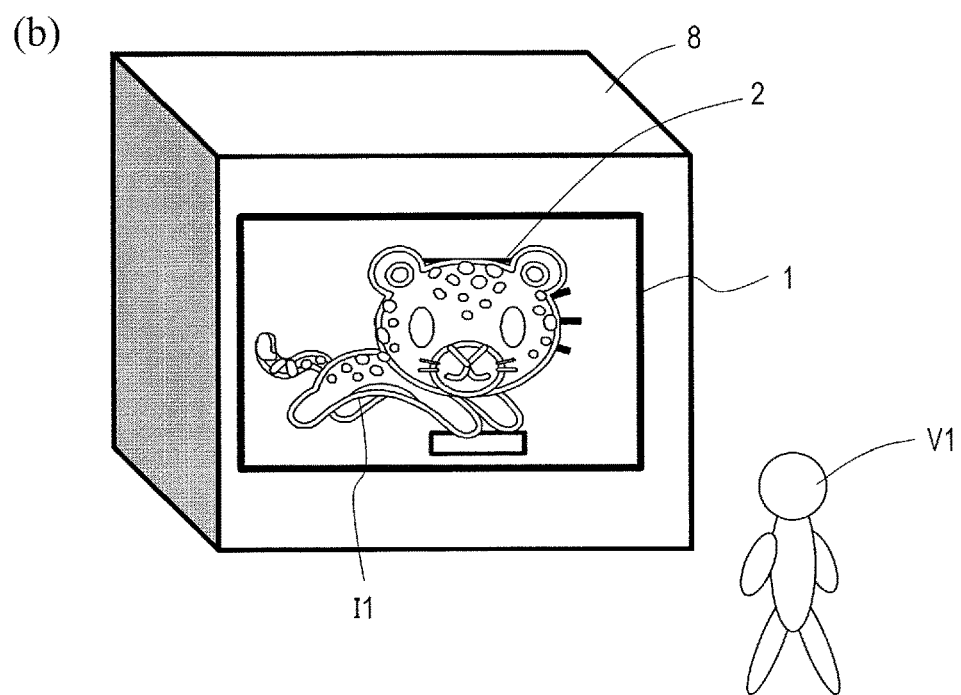

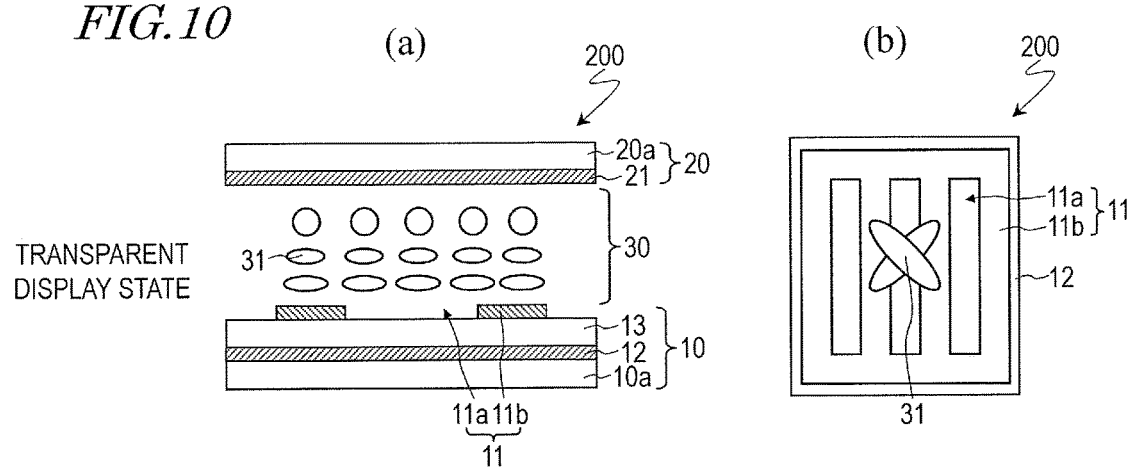
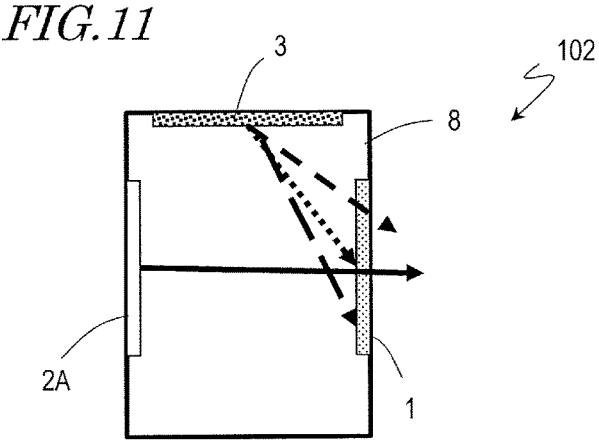

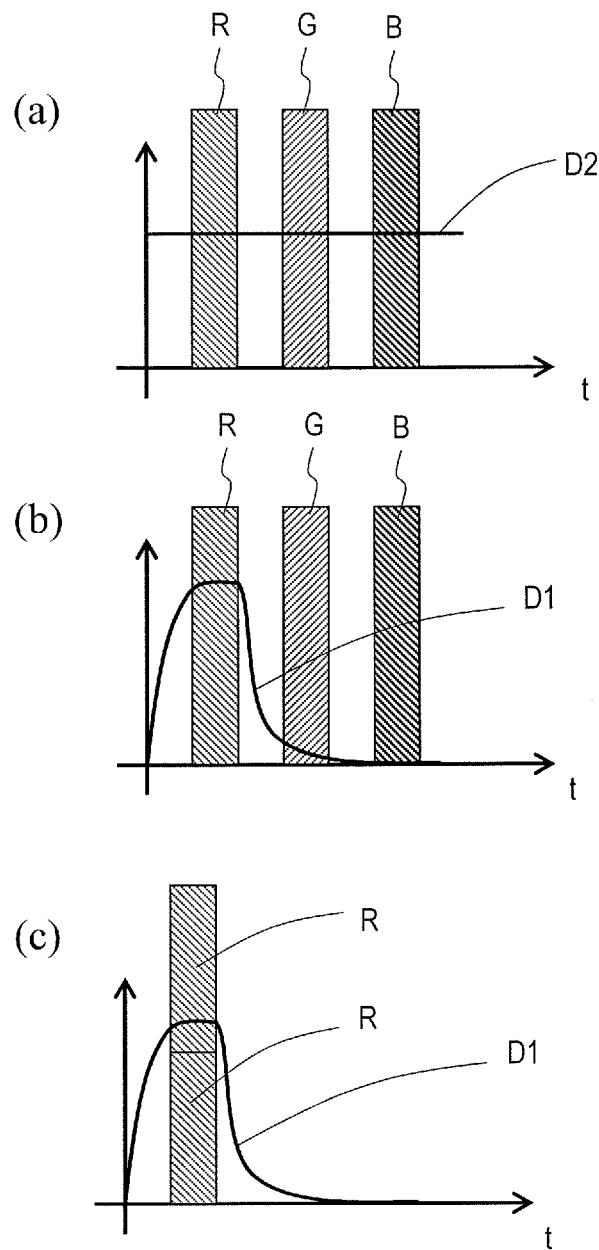

FIG.13
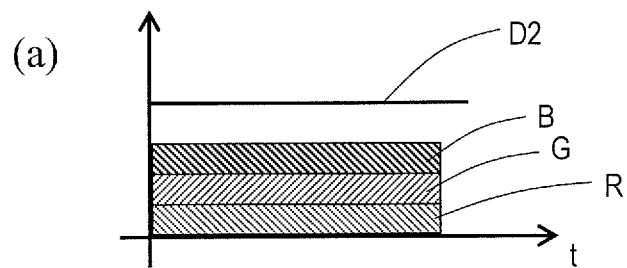
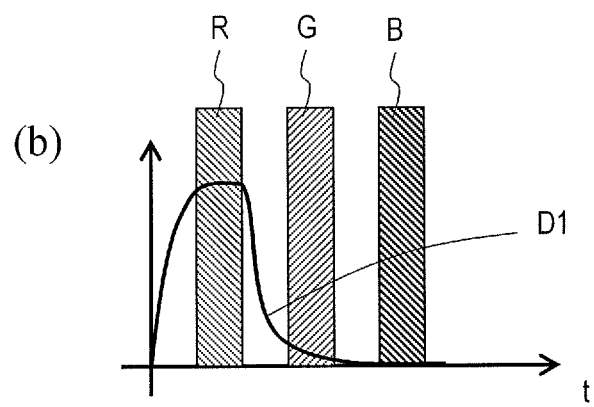
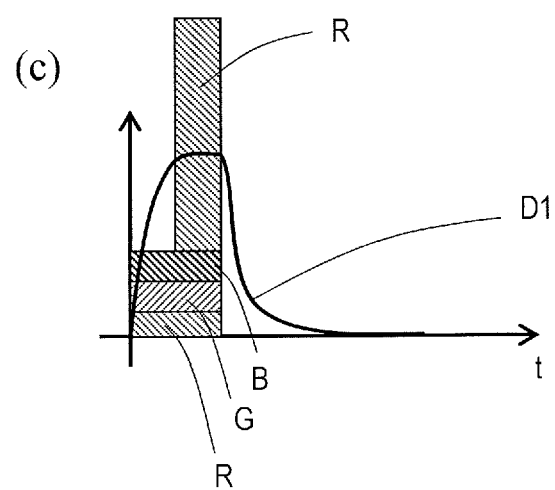

*FIG.14*
(a)
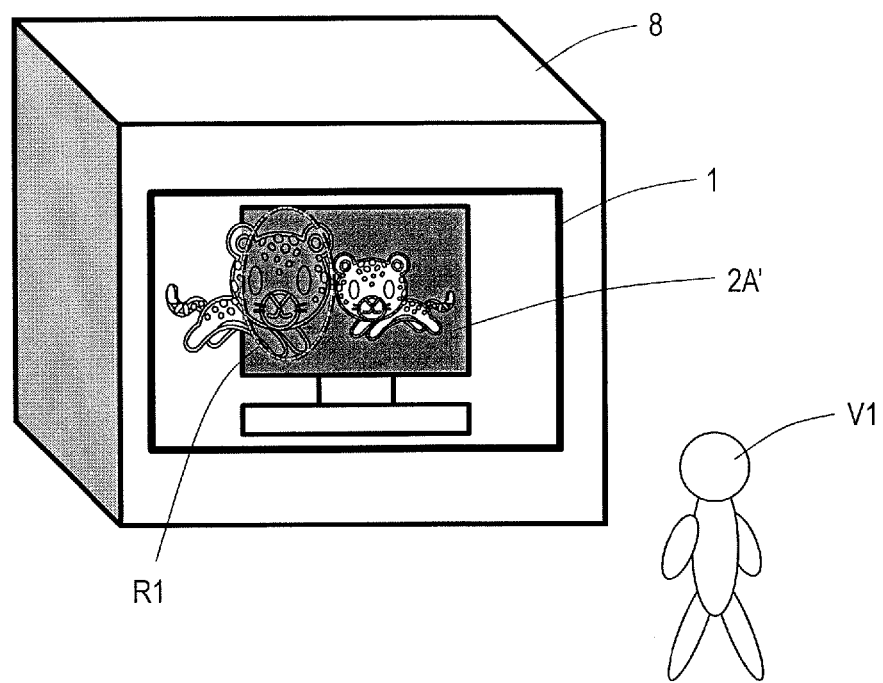
(b)
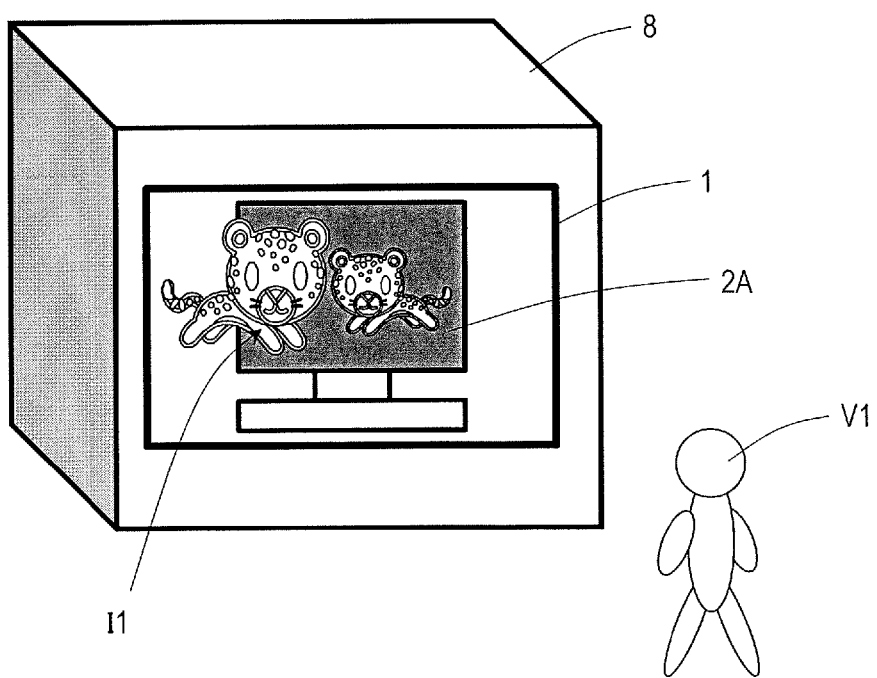

FIG.16
(a)
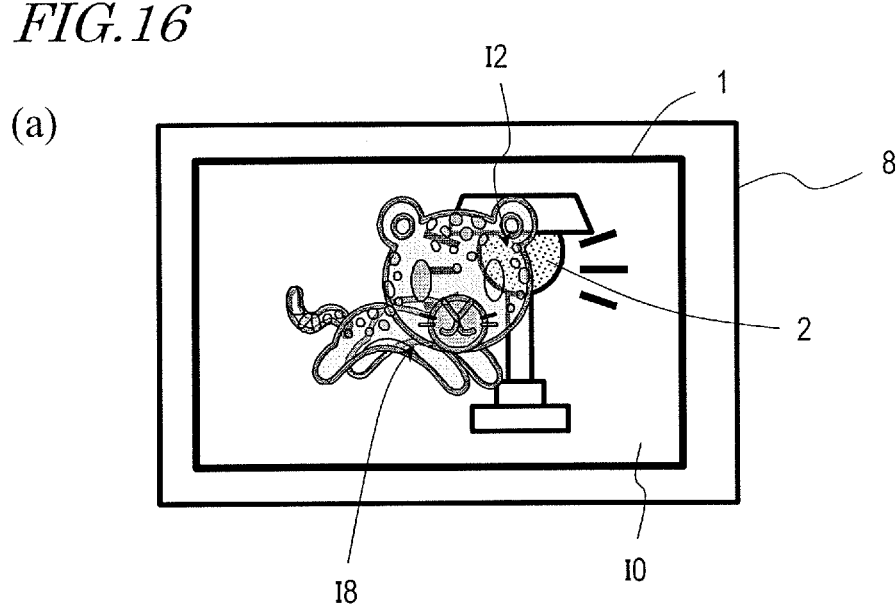
(b)
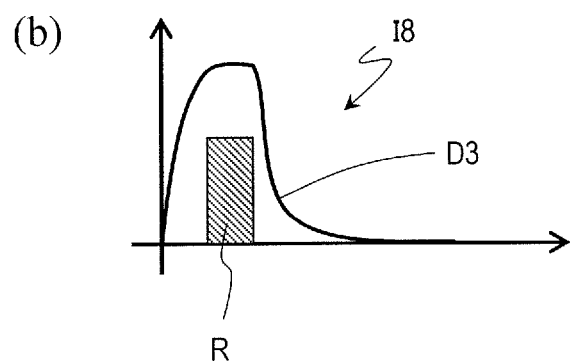
(c)
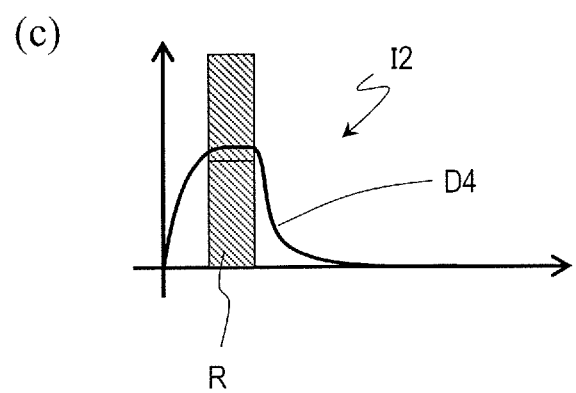

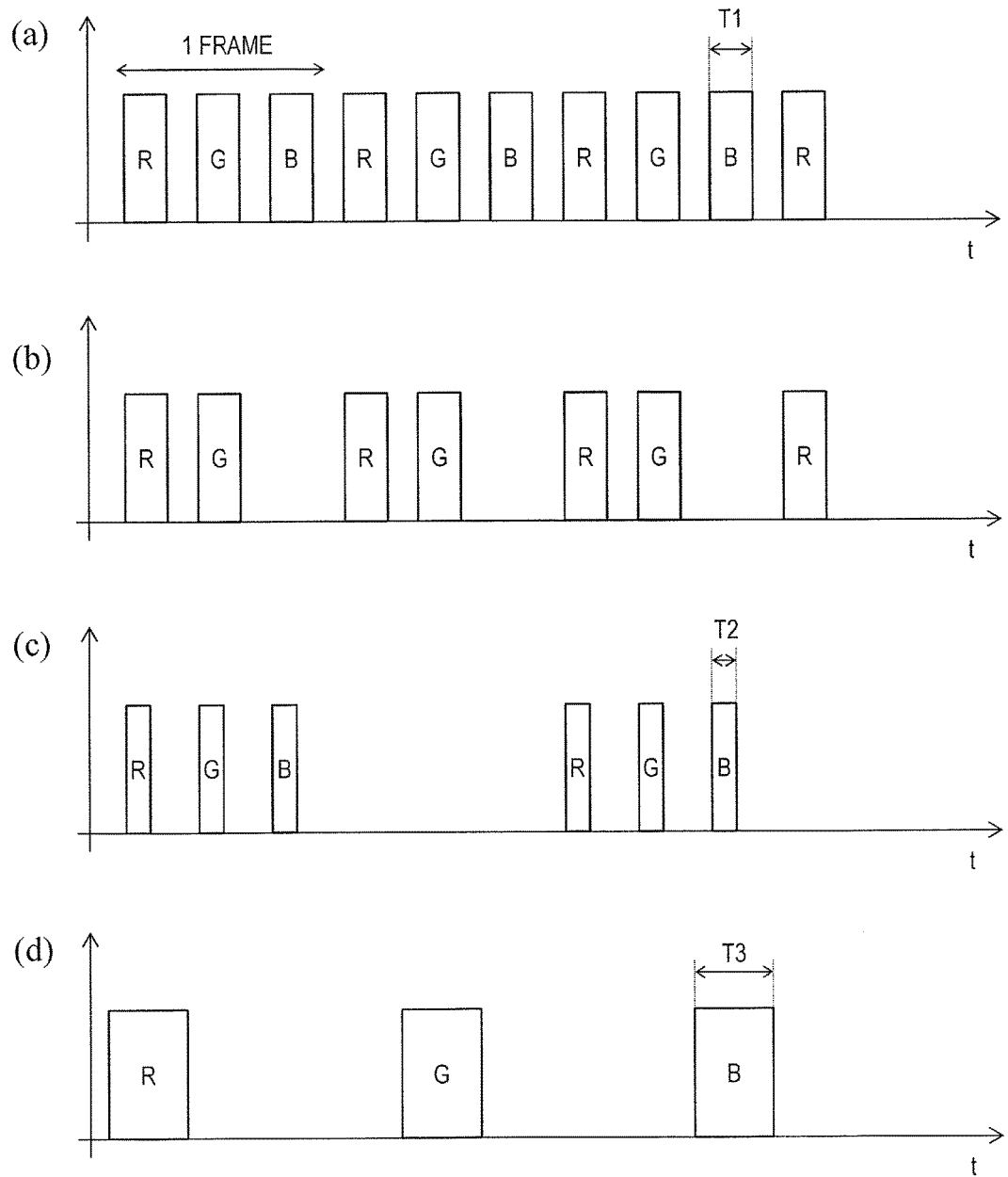

DISPLAY DEVICE

TECHNICAL FIELD

The present invention relates to a display device and particularly to a display device including a display panel which is capable of a see-through representation.

BACKGROUND ART

In recent years, see-through displays have been receiving attention as display devices for information displays and digital signage. In the see-through displays, the background scene (the rear surface side of the display panel) can be seen through, and therefore, information can be displayed on the display panel in such a manner that the information is superimposed on the background scene. This technology can realize a novel representation which cannot be realized by conventional display devices. Thus, the see-through displays are excellent in customer appeal and eye-catching effects. Meanwhile, uses of the see-through displays in showcases and show windows have been proposed.

When a liquid crystal display device is used as a see-through display, its low light utilization efficiency is a bottleneck. The low light utilization efficiency of the liquid crystal display device is attributed to color filters and polarizers which are included in common liquid crystal display devices. The color filters and polarizers absorb light in a particular wavelength band and light of a particular polarization direction.

In view of the above, using a field sequential type liquid crystal display device is considered. According to the field sequential method, a color display is performed by switching the color of light emitted from an illuminator unit for irradiation of a liquid crystal display panel in a time division manner. Therefore, the color filters are unnecessary, so that the light utilization efficiency improves. Note that, however, the field sequential method requires the liquid crystal display device to have high responsiveness.

Patent Documents 1 and 2 disclose liquid crystal display devices which include an electrode structure that is capable of alternately producing a longitudinal electric field and a transverse electric field across the liquid crystal layer, thereby achieving improved response characteristics. In the liquid crystal display devices disclosed in Patent Documents 1 and 2, a longitudinal electric field is produced across the liquid crystal layer at either of a transition from the black display state to the white display state (rising) and a transition from the white display state to the black display state (falling), and a transverse electric field (fringe electric field) is produced across the liquid crystal layer at the other transition. Therefore, a torque produced by application of the voltage affects liquid crystal molecules at both rising and falling, so that excellent response characteristics can be achieved.

Patent Document 3 proposes a liquid crystal display device in which high responsiveness is achieved by such an arrangement that an alignment regulating force produced by an electric field acts on liquid crystal molecules at both rising and falling.

CITATION LIST

Patent Literature

Patent Document 1: Japanese PCT National Phase Laid-Open Publication No. 2006-523850

Patent Document 2: Japanese Laid-Open Patent Publication No. 2002-365657
Patent Document 3: WO 2013/001979
Patent Document 4: WO 2011/043100

SUMMARY OF INVENTION

Technical Problem

Patent Document 4 discloses a see-through display which is configured using a light-scattering liquid crystal, such as PDLC (polymer dispersed liquid crystal) or PNLC (polymer network liquid crystal). The PDLC panel and the PNLC panel are capable of switching each pixel between a light-scattering state and a light-transmitting state according to the applied voltage. These display modes do not require use of polarizers, so that the light utilization efficiency can be improved.

Patent Document 4 also discloses a structure in which a plurality of PDLC panels are arranged with intervals such that the display surfaces of the panels overlap when viewed from the viewer's side. In this structure, an appropriate image is displayed on each of the PDLC panels, whereby a stereoscopic representation can be realized.

However, according to research conducted by the present inventors, when a light emitter (hereinafter, also referred to as "rear side light source") such as another display device, a lighting device, and various light-emitting devices is placed on the rear surface side of a display panel used as a see-through display (hereinafter, also referred to as "see-through panel"), there is a probability that an image for the see-through panel is not appropriately displayed.

The present invention was conceived in view of the above-described problems. One of the objects of the present invention is to perform an appropriate display in a display device which includes a display panel used as a see-through panel.

Solution to Problem

A display device according to an embodiment of the present invention includes: a display panel capable of being in a transparent display state where a background scene is viewable through the display panel; a panel light source that irradiates the display panel with colored light of a plurality of colors in a time division manner; a rear side light source placed on a rear surface side of the display panel, the rear side light source being capable of emitting colored light of a plurality of colors in a time division manner; and a control circuit that controls emission timings of the colored light from the panel light source and from the rear side light source, wherein the panel light source and the rear side light source are synchronized by the control circuit such that colored light of different colors are not emitted at a same timing.

In one embodiment, the display panel does not have a color filter and is driven by the panel light source according to a field sequential driving method.

In one embodiment, the panel light source and the rear side light source emit colored light of a same color at a same timing.

In one embodiment, the rear side light source includes a lighting device.

In one embodiment, the rear side light source includes a rear side display panel.

In one embodiment, the display device further includes a case, the display panel being attached to one side surface of_ the case, wherein the panel light source is provided on an inner wall of a side surface of the case which is different from the one side surface, and the rear side light source is provided inside the case.

In one embodiment, a reflectance of an inner wall of the case is greater than 18% that is a standard reflectance.

In one embodiment, an amount of colored light emitted from the rear side light source toward the display panel is smaller than an amount of colored light emitted from the panel light source toward the display panel.

In one embodiment, when viewed in a direction normal to a panel surface of the display panel, a first region in which the display panel and the rear side light source overlap and a second region in which the display panel and the rear side light source do not overlap are defined over the display panel, and when a same image is displayed in the first region and the second region, the display panel performs the display with different light transmittances.

In one embodiment, colored light emitted from the panel light source for irradiation of the display panel and colored light emitted from the rear side light source include red light, green light and blue light.

In one embodiment, colored light emitted from the panel light source for irradiation of the display panel and colored light emitted from the rear side light source further include white light.

In one embodiment, during a period in which the rear side light source emits white light, an image display region of the display panel is in such a state that light is not transmitted therethrough while a transparent display region of the display panel is in such a state that light is transmitted therethrough.

In one embodiment, the display device further includes another display panel capable of being in a transparent display state where a background scene is viewable through the another display panel, wherein the display panel, the rear side light source, and the another display panel are arranged so as to at least partially overlap when viewed in a direction normal to a panel surface of the display panel.

In one embodiment, the display panel includes a first substrate, a second substrate, and a liquid crystal layer held between the first substrate and the second substrate, the first substrate includes a first electrode and a second electrode which cooperates with the first electrode to produce a transverse electric field across the first liquid crystal layer, the second substrate includes a third electrode which is arranged so as to oppose the first electrode and the second electrode and which cooperates with the first electrode and the second electrode to produce a longitudinal electric field across the liquid crystal layer, and the display panel is capable of exhibiting, in each pixel, a black display state where a black display is performed with a longitudinal electric field produced across the liquid crystal layer, a white display state where a white display is performed with a transverse electric field produced across the liquid crystal layer, and a transparent display state where a rear surface side of the display panel is viewable through the display panel with no voltage applied across the liquid crystal layer, in a switchable manner.

In one embodiment, the liquid crystal layer is a TN type liquid crystal layer.

Advantageous Effects of Invention

According to a display device of an embodiment of the present invention, even when a rear side light source is placed on the rear surface side of a see-through panel, displaying on the see-through panel can be appropriately performed.

BRIEF DESCRIPTION OF DRAWINGS

FIG. 2 Graphs illustrating the RGB display periods and the transmittance of the liquid crystal layer when the display device of Embodiment 1 is driven according to a field sequential method. (a) is a graph illustrating a state of a rear side light source. (b) is a graph illustrating a state of a see-through panel. (c) is a graph illustrating a state of the see-through panel to which the influence of light from the rear side light source is added.

FIG. 3 Graphs for a display device of a comparative configuration, corresponding to FIGS. 2(a) to 2(c). (a) is a graph illustrating a state of a rear side light source. (b) is a graph illustrating a state of a see-through panel. (c) is a graph illustrating a state of the see-through panel to which the influence of light from the rear side light source is added.

FIG. 4 (a) is a diagram showing an image displayed when a lighting device placed behind the see-through panel is driven according to a driving method which is different from the field sequential method. (b) is a diagram showing an image displayed when the lighting device is driven in synchronization according to the field sequential method.

FIGS. 10 (a) and (b) are a cross-sectional view and a plan view showing the alignment of liquid crystal molecules when the liquid crystal display panel is in the transparent display state.

FIG. 11 A cross-sectional view schematically showing a display device according to Embodiment 2 of the present invention.

FIG. 12 Graphs illustrating the RGB display periods and the transmittance of the liquid crystal layer when the display device of Embodiment 2 is driven according to a field sequential method. (a) is a graph illustrating a state of a rear side light source. (b) is a graph illustrating a state of a see-through panel. (c) is a graph illustrating a state of the see-through panel to which the influence of light from the rear side light source is added.

FIG. 13 Graphs for a display device of a comparative configuration, corresponding to FIGS. 12(a) to 12(c). (a) is a graph illustrating a state of a rear side light source. (b) is a graph illustrating a state of a see-through panel. (c) is a graph illustrating a state of the see-through panel to which the influence of light from the rear side light source is added.

FIG. 14 (a) is a perspective view showing a display device of a reference example of Embodiment 2. (b) is a perspective view showing a display device of Embodiment 2.

FIG. 16 (a) is a plan view showing an image displayed on a see-through panel in the display device of Embodiment 3. (b) is a graph illustrating the light for irradiation and the state of response of the panel in a region which does not overlap the rear side light source. (c) is a graph illustrating the light for irradiation and the state of response of the panel in a region which overlaps the rear side light source.

FIG. 19 Charts for illustrating a state where display on the see-through panel and emission of colored light from the rear side light source are synchronized with each other. (a) shows the display timings of respective colored light on the see-through panel. (b) to (d) show the emission timings of respective colored light from the rear side light source.

DESCRIPTION OF EMBODIMENTS

Hereinafter, embodiments of the present invention will be described with reference to the drawings. Note that the present invention is not limited to the embodiments described below.

Embodiment 1

Figure 1:
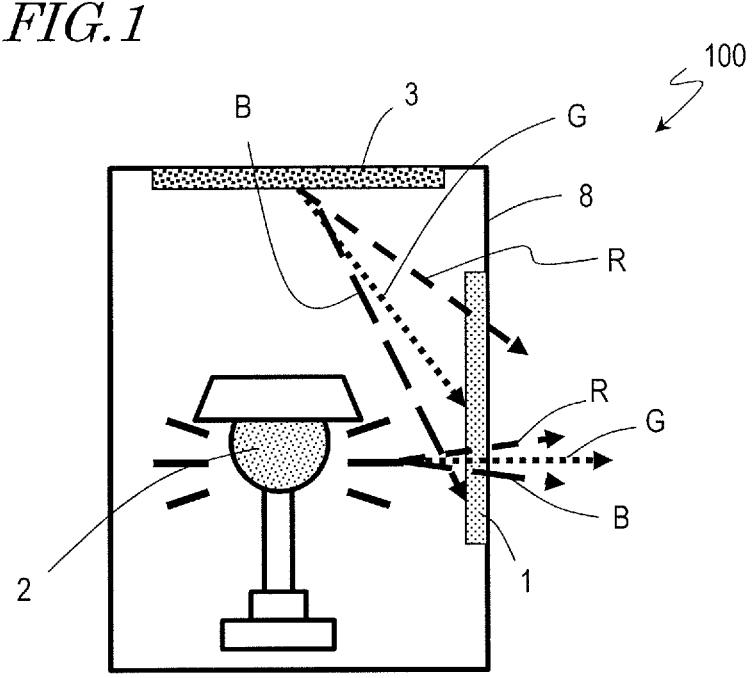
FIG. 1 A cross-sectional view schematically showing a display device according to Embodiment 1 of the present invention.

FIG. 1 is a schematic cross-sectional view showing the structure of a display device 100 of Embodiment 1. The display device 100 includes a box-like case 8, a see-through panel 1 placed at a side surface of the box-like case 8, and a light source 3 for the see-through panel 1 (hereinafter, also referred to as "panel light source 3") which is placed on the ceiling of the case 8.

The see-through panel 1 is configured to display images on a panel surface in an image display state and to make the background scene viewable in a transparent display state. When the see-through panel 1 is in the transparent display state, a viewer can visually perceive the background scene (here, the inside of the case 8) through the see-through panel 1. The see-through panel 1 is capable of switching each pixel between the image display state and the transparent display state. Therefore, the see-through panel 1 can operate such that the background scene is viewable through only a portion of the panel surface. Note that specific construction examples of the see-through panel 1 will be described later.

The see-through panel 1 of the present embodiment is driven according to the field sequential method with the use of the panel light source 3. In the see-through panel 1, for example, a red light display period (hereinafter, also referred to as "R display period"), a green light display period (hereinafter, also referred to as "G display period"), and a blue light display period (hereinafter, also referred to as "B display period") are set. The R display period, the G display period and the B display period are set so as not to temporally overlap. At least three display periods including one R display period, one G display period and one B display period are set within a period for displaying one full-color image (one frame period: for example, 16.7 ms). On the panel surface of the see-through panel 1 that operates in such a way, a red component image, a green component image and a blue component image which constitute a full-color image are sequentially displayed in a time division manner within one frame period.

The panel light source 3 irradiates the see-through panel 1 with red light R, green light G and blue light B which are switched in a time division manner. The light source 3 emits only red light R in the R display period of the see-through panel 1, only green light G in the G display period, and only blue light B in the B display period. The timings of pixel driving in the see-through panel 1 and the emission timings of respective colored light from the light source 3 thus need to be in synchronization with each other. To this end, the display device 100 may include a control circuit for synchronizing the R display period, the G display period and the B display period of the see-through panel 1 with the emission timings of red light R, green light G and blue light B from the light source 3. The control circuit may be, for example, a known control circuit for sequential driving which is configured to control the emission timings of respective colored light R, G, B from the light source 3 based on a vertical or horizontal synchronization signal input to the see-through panel 1.

The panel light source 3 can be, for example, an illuminator which includes a light source unit and a lightguide. Here, the light source unit is capable of emitting light of a plurality of colors including red light R, green light G and blue light B. The light source unit includes, for example, a red LED, a green LED and a blue LED. The lightguide is capable of guiding colored light emitted from the light source unit to the see-through panel 1. Note that the light source 3 (and the above-described control circuit) can be realized by any of various known illuminator units which have been used in conventional field sequential type display devices.

The light source 3 is capable of irradiating the see-through panel 1 with red light R, green light G and blue light B which are switched in a time division manner. In order that as much light from the light source 3 as possible enters the see-through panel 1, the interior surfaces of the case 8 may have a light-diffusing property. When the interior surfaces of the case 8 are white in color, the interior surfaces can efficiently reflect all colored light so that, as for each of red light R, green light G and blue light B, a larger amount of light travels to the see-through panel 1.

The see-through panel 1 performs a color display according to the field sequential method as described above and therefore does not have a color filter. That is, the see-through panel 1 does not have color pixels, such as a R sub-pixel for displaying a red component, a G sub-pixel for displaying a green component, and a B sub-pixel for displaying a blue component, which are typically included in color filter based display panels. The pixels of the see-through panel 1 each function as a pixel which solely performs a full-color display.

According to the field sequential method, the R display period, the G display period, and the B display period are set so as not to temporally overlap as described above. Thus, in comparison to common color filter based display devices which have R sub-pixels, G sub-pixels, and B sub-pixels and in which the R display period, the G display period, and the B display period overlap (i.e., the three colors are concurrently displayed), the driving frequency of the pixels needs to be, for example, three times that of the common color filter based display devices in order to achieve the same frame rate for displaying of images.

In the display device 100 of the present embodiment, a lighting device 2 is housed in the case 8. Note that the lighting device 2 can be regarded as a light source placed behind the see-through panel 1 (a light source which can emit light so as to reach the see-through panel 1) and is therefore also referred to as "rear side light source".

The lighting device 2 may be, for example, a lamp for illuminating a product placed in the case 8. Alternatively, the lighting device 2 itself may be a product. Note that, however, the lighting device 2 is not limited to such examples. The lighting device 2 may have various forms. For example, the lighting device (rear side light source) 2 may be a display device such as described later (e.g., a liquid crystal display device which includes a backlight and a liquid crystal panel), a color LED panel, or any other type of light-emitting device.

Here, the lighting device 2 is capable of emitting red light R, green light G and blue light B in a time division manner as is the panel light source 3. The lighting device 2 may be, for example, a lighting device which includes a red LED, a green LED and a blue LED, and which controls the color of emitted light using a control circuit which controls the emission timings of the respective LEDs.

Here, the emission timings of respective colored light from the lighting device 2 and the emission timings of respective colored light from the panel light source 3 are in synchronization with each other. In this specification, "in synchronization with" and "synchronized" typically mean that light of the same color are emitted in the same period. Note that, however, in the lighting device 2 and the panel light source 3, the cycles or periods in which respective colored light are emitted are not necessarily coincident. The lighting device 2 and the panel light source 3 are controlled such that each of them does not emit light of different colors in the same period.

FIGS. 19(a) to 19(d) show various forms where the display periods of respective colored light on the see-through panel 1 (or the emission durations of respective colored light from the panel light source 3) are synchronized with the emission durations of respective colored light from the lighting device (rear side light source) 2. FIG. 19(a) is a chart showing the display timings of respective colored light (here, red light R, green light G, blue light B) on the see-through panel 1. FIGS. 19(b) to 19(d) are charts showing variations of the emission timings of respective colored light from the lighting device 2.

It is herein assumed that, on the see-through panel 1, a display with red light R, a display with green light G, and a display with blue light B are performed sequentially in this order for a predetermined duration T1 as shown in FIG. 19(a). In this case, typically, emission of red light R from the lighting device 2, emission of green light G from the lighting device 2, and emission of blue light B from the lighting device 2 are also performed sequentially with the same periodicity for the same predetermined duration T1, so as to be in synchronization.

Note that, however, the emission durations and emission timings of the respective colored light from the lighting device 2 may not be identical with those of the light from the panel light source 3 shown in FIG. 19(a). For example, when only red light R and green light G are emitted from the lighting device 2 as shown in FIG. 19(b) (e.g., when a product placed in the case 8 is to be illuminated in yellow), it is only necessary that the emission timings of red light R and green light G from the lighting device 2 are respectively identical with the emission timings of red light R and green light G from the panel light source 3.

Alternatively, as shown in FIG. 19(c), the lighting device 2 may perform emission of red light R, emission of green light G, and emission of blue light B for a predetermined period T2 which is shorter than the predetermined duration T1. Note that, however, the emission timings of respective colored light from the lighting device 2 are identical with the emission timings of respective colored light from the panel light source 3, so that the lighting device 2 and the light source 3 do not emit light of different colors at an arbitrary time. Still alternatively, as shown in FIG. 19(c), the lighting device 2 may perform emission of respective colored light with a longer period (at a lower frequency) than the panel light source 3.

Still alternatively, as shown in FIG. 19(d), the lighting device 2 may perform emission of red light R, emission of green light G, and emission of blue light B for a predetermined period T3 which is longer than the predetermined duration T1 in the see-through panel 1. Note that, however, also in this case, in the display periods of respective colored light on the see-through panel 1, the lighting device 2 is controlled so as not to emit light of a different color.

The display device 100 of the present embodiment includes a control circuit that controls the see-through panel 1, the lighting device 2, and the light source 3 such that the display timings of respective colored light on the see-through panel 1, the emission timings of respective colored light from the panel light source 3, and the emission timings of respective colored light from the lighting device (rear side light source) 2 are synchronized as described above. This control circuit can be realized by any of various known control circuits for sequential driving of a display panel. For example, the control circuit may be configured to generate a timing signal for allowing the panel light source 3 to emit respective colored light in synchronization with display on the see-through panel 1 and send the generated timing signal not only to the panel light source 3 but also to the lighting device 2.

FIG. 2(a) shows the emission timings of red light R, green light G and blue light B from the lighting device (rear side light source) 2. FIG. 2(b) shows the emission timings of red light R, green light G and blue light B on the see-through panel 1 (R display period, G display period, B display period) and the response state D1 (transmittance) of the see-through panel 1. Note that the horizontal axis of the graph represents time t.

As seen from FIGS. 2(a) and 2(b), the lighting device 2 of this example emits all of red light R, green light G and blue light B and thereby emits pseudo-white light. Meanwhile, at the see-through panel 1 of this example, red light R is selectively transmitted, whereby a red display is performed.

When both the see-through panel 1 and the lighting device 2 are driven according to the field sequential method, as shown in FIGS. 2(a) and 2(b), in the R display period, the G display period, and the B display period of the see-through panel 1, the lighting device 2 respectively emits red light R, green light G and blue light B in synchronization with these periods. So long as the emission timings of respective colors are thus synchronized, a display with high color purity can be performed.

Describing more specifically, as shown in FIG. 2(c), a red color display on the see-through panel 1 which is actually viewed (the synthesis of the display on the see-through panel 1 in the R display period and the light emitted from the lighting device 2) is performed in such a manner that colored light components other than red light are not mixed in. This is because the lighting device 2 also emits only red light in the R display period of the see-through panel 1. Note that, as seen from the graph of the response state D1, the see-through panel 1 does not transmit light in the G display period and the B display period, so that green light G and blue light B emitted from the lighting device 2 cannot affect the display on the see-through panel 1. Therefore, on the see-through panel 1, a desirable display can be performed without deteriorating the color purity.

FIGS. 3(a) to 3(c) illustrate, as a reference example, a case where a color display is performed on the see-through panel 1 according to the field sequential method, and a white light source is used as a lighting device 2' (see FIG. 4). FIGS. 3(a) to 3(c) correspond to FIGS. 2(a) to 2(c).

Also in the case described herein, the lighting device 2' emits white light, and the see-through panel 1 performs a red display. In this case, as shown in FIG. 3(a), the lighting device 2' of the reference example emits red light R, green light G and blue light B concurrently and continuously. Meanwhile, as shown in FIG. 3(b), the see-through panel 1 transmits red light in the R display period but does not transmit green light G and blue light B in the G display period and the B display period.

In this case, as shown in FIG. 3(c), the color of the red color display on the see-through panel 1 is affected by white light emitted from the lighting device 2'. This is because, in the R display period of the see-through panel 1, the lighting device 2' emits not only red light R but also green light G and blue light B toward the see-through panel 1. Therefore, the red color display on the see-through panel 1 to be viewed (the synthesis of the display on the see-through panel 1 in the R display period and the light emitted from the lighting device 2') appears whitish so that the color purity deteriorates.

FIGS. 4(a) and 4(b) illustrate the differences between the display which is actually viewed when the lighting device 2 is driven according to a driving method which is different from the field sequential method (FIGS. 3(a) to 3(c)) and the display which is actually viewed when the lighting device 2 is driven according to a synchronized field sequential method (FIGS. 2(a) to 2(c)), while the see-through panel 1 is driven according to the field sequential method. As shown in FIG. 4(a), when the lighting device 2' is driven according to a driving method which is different from the field sequential method, a viewer V1 does not perceive that a displayed image I1' on the see-through panel 1 is in a desired color in a region extending over the lighting device 2'. This is because colored light emitted from the lighting device 2' are mixed in a displayed image on the see-through panel 1. On the other hand, when the lighting device 2 is also driven according to a synchronized field sequential method as shown in FIG. 4(b), a displayed image I1 on the see-through panel 1 can be appropriately displayed in a desired color to the viewer V1.

Although in the above-described configuration the emission timings of colored light are synchronized between the see-through panel 1 and the rear side light source 2 that is provided on the rear surface side of the see-through panel 1, the see-through panel 1 may have various forms. In the following section, an exemplary structure is described in which a liquid crystal display panel which operates in a TN (twisted nematic) mode is used as the see-through panel 1.

Figure 5:
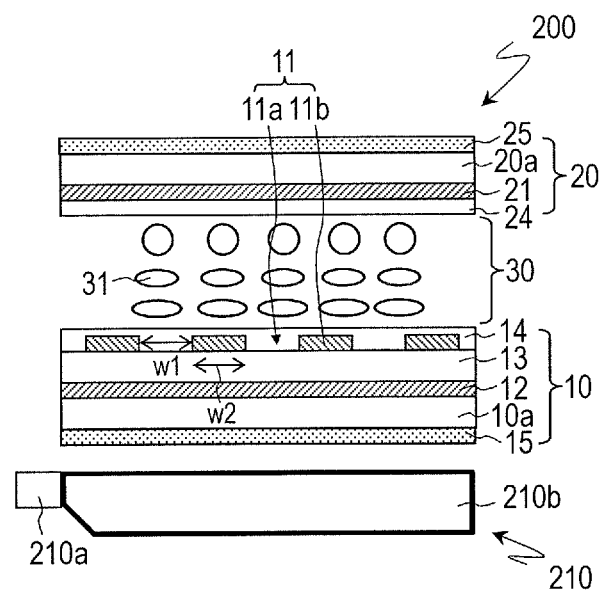
FIG. 5 A cross-sectional view schematically showing a liquid crystal display panel according to an embodiment of the present invention.
Figure 6:
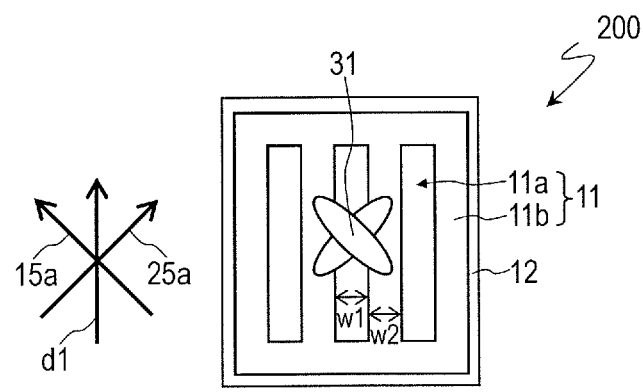
FIG. 6 A plan view schematically showing a liquid crystal display panel according to an embodiment of the present invention.

FIG. 5 and FIG. 6 are a cross-sectional view and a plan view schematically showing the structure of a liquid crystal display panel 200 which is used as the see-through panel 1 of the present embodiment and an illuminator unit 210. The liquid crystal display panel 200 has a plurality of pixels arranged in a matrix. The structure shown in FIG. 5 and FIG. 6 corresponds to one pixel.

The liquid crystal display panel 200 includes a TFT substrate (rear substrate) 10 and a counter substrate (front substrate) 20 opposing each other and a liquid crystal layer 30 provided between the TFT substrate 10 and the counter substrate 20.

The TFT substrate 10 includes a first electrode 11 which is provided in each of the plurality of pixels and a second electrode 12 which cooperates with the first electrode 11 to produce a transverse electric field across the liquid crystal layer 30. The first electrode 11 is positioned above the second electrode 12 with an insulating layer 13 interposed therebetween. In other words, the second electrode 12 is positioned under the first electrode 11 with the insulating layer 13 interposed therebetween. In the following, as for the first electrode 11 and the second electrode 12, the first electrode 11 that is at a relatively upper level is referred to as "upper layer electrode" while the second electrode 12 that is at a relatively lower level is referred to as "lower layer electrode". The lower layer electrode 12, the insulating layer 13 and the upper layer electrode 11 are supported by an insulative transparent substrate (e.g., glass substrate) 10a.

The upper layer electrode 11 has a plurality of slits 11a extending in a predetermined direction d1 and a plurality of branch portions 11b extending in parallel in the direction d1 of extension of the slits 11a as shown in FIG. 5 and FIG. 6. Note that the number of the slits 11a and the number of the branch portions 11b are not limited to those illustrated in FIG. 5 and FIG. 6. The width of the slits 11a, w1, is not particularly limited. The width of the slits 11a, w1, is typically not less than 2 µm and not more than 10 µm. The width of the branch portions 11b, w2, is not particularly limited. The width of the branch portions 11b, w2, is typically not less than 2 µm and not more than 10 µm. The upper layer electrode 11 is made of a transparent electrically-conductive material (e.g., ITO).

The lower layer electrode 12 does not have a slit. That is, the lower layer electrode 12 is a so-called solid electrode. The lower layer electrode 12 is also made of a transparent electrically-conductive material (e.g., ITO).

The material of the insulating layer 13 is not particularly limited. Examples of the material of the insulating layer 13 which can be used herein include inorganic materials such as silicon oxide ($SiO_2$) and silicon nitride ($SiN_x$) and organic materials such as photosensitive resins.

The counter substrate 20 includes a third electrode (hereinafter, referred to as "counter electrode") 21 which is arranged so as to oppose the upper layer electrode 11 and the lower layer electrode 12. The counter electrode 21 is supported by an insulative transparent substrate (e.g., glass substrate) 20a.

The counter electrode 21 cooperates with the upper layer electrode 11 and the lower layer electrode 12 to produce a longitudinal electric field across the liquid crystal layer 30. The counter electrode 21 is made of a transparent electrically-conductive material (e.g., ITO).

The liquid crystal layer 30 includes liquid crystal molecules 31 which have positive dielectric anisotropy. That is, the liquid crystal layer 30 is made of a positive liquid crystal material. Note that the directions of orientation of the liquid crystal molecules 31 shown in FIG. 5 and FIG. 6 are those achieved when no voltage is applied across the liquid crystal layer 30.

The liquid crystal display panel 200 further includes a pair of horizontal alignment films 14 and 24 which are arranged so as to oppose each other via the liquid crystal layer 30. One of the pair of horizontal alignment films 14 and 24 (hereinafter, also referred to as "first horizontal alignment film 14") is provided over a surface of the rear substrate 10 on the liquid crystal layer 30 side. The other of the pair of horizontal alignment films 14 and 24 (hereinafter, also referred to as "second horizontal alignment film 24") is provided over a surface of the front substrate 20 on the liquid crystal layer 30 side.

Each of the first horizontal alignment film 14 and the second horizontal alignment film 24 has been subjected to an alignment treatment and has an alignment regulating force so as to orient the liquid crystal molecules 31 of the liquid crystal layer 30 in a predetermined direction (which is referred to as "pretilt direction"). Examples of the alignment treatment include rubbing and a photo-alignment treatment. The first horizontal alignment film 14 and the second horizontal alignment film 24 exert an alignment regulating force such that the liquid crystal molecules 31 are in a twist alignment during the absence of a voltage across the liquid crystal layer 30 (or during the absence of an electric field across the liquid crystal layer 30). The alignment regulating direction of the first horizontal alignment film 14 and the alignment regulating direction of the second horizontal alignment film 24 are different by 90° when viewed in a direction normal to the panel surface.

More specifically, the pretilt directions which are defined by respective ones of the first horizontal alignment film 14 and the second horizontal alignment film 24 form an angle of about 45° to the direction of extension of the slits 11a of the upper layer electrode 11 (direction d1). The pretilt direction which is defined by the second horizontal alignment film 24 forms an angle of 90° to the pretilt direction which is defined by the first horizontal alignment film 14. Therefore, during the absence of a voltage across the liquid crystal layer 30, the liquid crystal molecules 31 are in a 90°-twist alignment.

Figure 7:
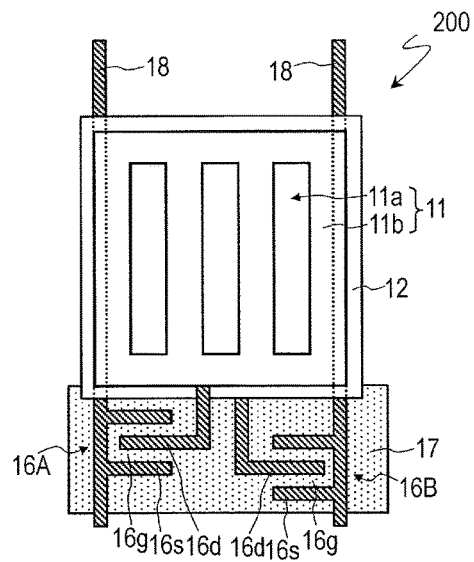
FIG. 7 A plan view schematically showing a liquid crystal display panel according to an embodiment of the present invention.

The liquid crystal display panel 200 further includes a pair of polarizers 15 and 25 which are arranged so as to oppose each other via the liquid crystal layer 30. The transmission axis 15a of one of the pair of polarizers 15 and 25 (hereinafter, also referred to as "first polarizer 15") and the transmission axis 25a of the other polarizer (hereinafter, also referred to as "second polarizer 25") are generally perpendicular to each other as shown in FIG. 7. That is, the first polarizer 15 and the second polarizer 25 are in a crossed Nicols arrangement.

The transmission axes 15a and 25a of the first polarizer 15 and the second polarizer 25 are generally parallel to, or generally perpendicular to, the pretilt directions defined by respective ones of the first horizontal alignment film 14 and the second horizontal alignment film 24. Therefore, the transmission axes 15a and 25a of the first polarizer 15 and the second polarizer 25 each form an angle of about 45° to the direction of extension of the slits 11a of the upper layer electrode 11 (direction d1).

The illuminator unit (also referred to as "backlight") 210 is placed on the rear surface side of the liquid crystal display panel 200. The illuminator unit 210 is capable of irradiating the liquid crystal display panel 200 with light of a plurality of colors, including red light R, green light G and blue light B, in a switchable manner. Note that, in the display device 100 shown in FIG. 1, the light source 3 at the ceiling of the case 8 is used as a light source for field sequential driving. On the other hand, in the present embodiment, the light-transmissive illuminator unit 210 placed behind the liquid crystal display panel 200 is used instead of the light source 3, so that a viewer can view the background scene through the liquid crystal display panel 200 and the illuminator unit 210.

The illuminator unit 210 can be, for example, an edge-light type backlight such as shown in FIG. 6. The edge-light type backlight 210 includes a light source unit 210a and a lightguide 210b. The light source unit 210a is capable of emitting light of a plurality of colors including red light R, green light G and blue light B. The light source unit 210a includes, for example, a red LED, a green LED and a blue LED. The lightguide 210b is designed to guide colored light emitted from the light source unit 210a to the liquid crystal display panel 200.

The thus-configured liquid crystal display panel 200 and illuminator unit 210 perform a color display according to the field sequential method. Therefore, the liquid crystal display panel 200 does not have a color filter. According to the field sequential method, in each pixel, a R display period, a G display period and a B display period are provided so as not to temporally overlap.

In the liquid crystal display panel 200, when a predetermined voltage (i.e., a predetermined potential difference) is applied between the upper layer electrode 11 and the lower layer electrode 12, a transverse electric field (fringe electric field) is produced across the liquid crystal layer 30. The "transverse electric field" refers to an electric field which includes a component generally parallel to the substrate surface. The direction of the transverse electric field produced by the upper layer electrode 11 and the lower layer electrode 12 is generally perpendicular to the direction of extension of the slits 11a of the upper layer electrode 11 (direction d1).

On the other hand, when a predetermined voltage (i.e., a predetermined potential difference) is applied between the counter electrode 21 and the upper layer electrode 11 and the lower layer electrode 12, a longitudinal electric field is produced. The "longitudinal electric field" refers to an electric field whose direction is generally parallel to the normal direction of the substrate surface.

The liquid crystal display panel 200 has a structure which is capable of controlling the intensity of the transverse electric field and the intensity of the longitudinal electric field in each pixel. Typically, the liquid crystal display device has a structure which is capable of supplying different voltages to respective pixels in each of the upper layer electrode 11 and the lower layer electrode 12. Specifically, both the upper layer electrode 11 and the lower layer electrode 12 are separately provided in each pixel. Each pixel includes a switching element (e.g., a thin film transistor; not shown) electrically connected with the upper layer electrode 11 and a switching element (e.g., a thin film transistor; not shown) electrically connected with the lower layer electrode 12. The upper layer electrode 11 and the lower layer electrode 12 are each supplied with a predetermined voltage via a corresponding switching element. The counter electrode 21 is in the form of a single electrically-conductive film which is continuous across all of the pixels. Therefore, the potential applied to the counter electrode 21 is common to all of the pixels.

FIG. 7 shows a specific example of the wiring structure in the rear substrate 10. In the structure shown in FIG. 7, each pixel includes a first TFT 16A corresponding to the upper layer electrode 11 and a second TFT 16B corresponding to the lower layer electrode 12.

The gate electrodes 16g of the first TFT 16A and the second TFT 16B are electrically connected with a gate bus line (scan line) 17. Here, portions of the gate bus line 17 extending over the channel regions of the first TFT 16A and the second TFT 16B function as the gate electrodes 16g. The source electrodes 16s of the first TFT 16A and the second TFT 16B are electrically connected with a source bus line (signal line) 18. Here, portions branching out from the source bus line 18 function as the source electrodes 16s. The drain electrode 16d of the first TFT 16A is electrically connected with the upper layer electrode 11. Meanwhile, the drain electrode 16d of the second TFT 16B is electrically connected with the lower layer electrode 12. Note that the wiring structure of the rear substrate 10 is not limited to the example illustrated in FIG. 7.

In the liquid crystal display panel 200 of the present embodiment, each of the plurality of pixels can exhibit, in a switchable manner, a "black display state" where a black display is performed with a longitudinal electric field produced across the liquid crystal layer 30, a "white display state" where a white display is performed with a transverse electric field produced across the liquid crystal layer 30, and a "transparent display state" where the rear surface side of the liquid crystal display panel 200 (i.e., the background scene) is viewable through the liquid crystal display panel 200 with no voltage applied across the liquid crystal layer 30.

Figure 8:
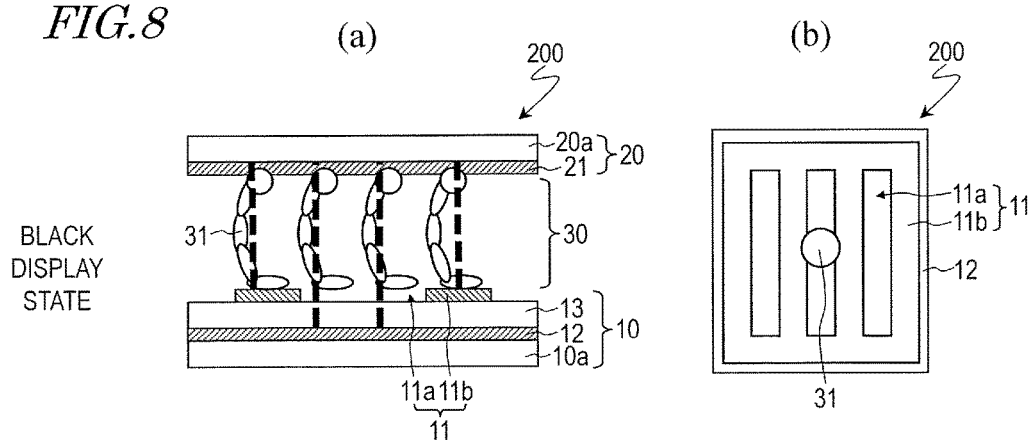
FIGS. 8 (a) and (b) are a cross-sectional view and a plan view showing the alignment of liquid crystal molecules when the liquid crystal display panel is in the black display state.
Figure 9:
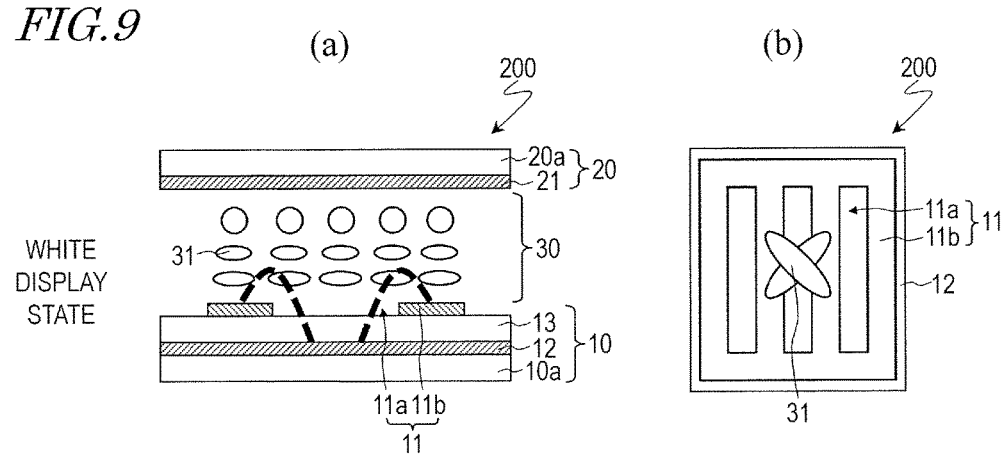
FIGS. 9 (a) and (b) are a cross-sectional view and a plan view showing the alignment of liquid crystal molecules when the liquid crystal display panel is in the white display state.

Hereinafter, the black display state, the white display state, and the transparent display state are described more specifically with reference to FIG. 8, FIG. 9, and FIG. 10.

FIGS. 8(a) and 8(b) show the alignment of the liquid crystal molecules 31 in the black display state. In the black display state, a predetermined voltage is applied between the counter electrode 21 and the upper layer electrode 11 and the lower layer electrode 12 (for example, a potential of 0 V is applied to the counter electrode 21 while a potential of 7.5 V is applied to the upper layer electrode 11 and the lower layer electrode 12), so that a longitudinal electric field is produced across the liquid crystal layer 30. FIG. 8(a) schematically shows lines of electric force produced in this case by means of broken lines.

In this black display state, the liquid crystal molecules 31 of the liquid crystal layer 30 are oriented generally perpendicular to the substrate surface (the surfaces of the rear substrate 10 and the front substrate 20), i.e., oriented generally parallel to a direction normal to the liquid crystal layer 30, as shown in FIGS. 8(a) and 8(b). Note that liquid crystal molecules 31 which are very near the first horizontal alignment film 14 and the second horizontal alignment film 24 are strongly affected by the alignment regulating forces of the first horizontal alignment film 14 and the second horizontal alignment film 24 and therefore remain oriented generally parallel to the substrate surface. However, these liquid crystal molecules 31 are generally parallel to, or generally perpendicular to, the transmission axis 15a of the first polarizer 15 and therefore scarcely cause retardation in light which has passed through the first polarizer 15 and entered the liquid crystal layer 30 and scarcely decrease the contrast ratio.

FIGS. 9(a) and 9(b) show the alignment of the liquid crystal molecules 31 in the white display state. In the white display state, a predetermined voltage is applied between the upper layer electrode 11 and the lower layer electrode 12 (for example, a potential of 0 V is applied to the upper layer electrode 11 and the counter electrode 21 while a potential of 7.5 V is applied to the lower layer electrode 12), so that a transverse electric field (fringe electric field) is produced across the liquid crystal layer 30. FIG. 9(a) schematically shows lines of electric force produced in this case by means of broken lines.

In this white display state, the liquid crystal molecules 31 of the liquid crystal layer 30 are oriented generally parallel to the substrate surface, i.e., oriented generally perpendicular to a direction normal to the liquid crystal layer 30, as shown in FIGS. 9(a) and 9(b). More specifically, liquid crystal molecules 31 which are near the first horizontal alignment film 14 and liquid crystal molecules 31 which are near the second horizontal alignment film 24 are oriented so as to form an angle of about 90°, and as a result, liquid crystal molecules 31 which are present in a center portion of the liquid crystal layer 30 in terms of the thickness direction are oriented generally parallel to the direction of extension of the slits 11a of the upper layer electrode 11 (direction d1). Therefore, the average orientation direction of the bulk liquid crystal is generally parallel to the direction of extension of the slits 11a (direction d1), i.e., forms an angle of about 45° to the transmission axes 15a and 25a of the first polarizer 15 and the second polarizer 25.

FIGS. 10(a) and 10(b) show the alignment of the liquid crystal molecules 31 in the transparent display state. In the transparent display state, no voltage is applied across the liquid crystal layer 30 (for example, a potential of 0 V is applied to each of the upper layer electrode 11, the lower layer electrode 12, and the counter electrode 21), so that none of a longitudinal electric field and a transverse electric field is produced across the liquid crystal layer 30.

In this transparent display state, the liquid crystal molecules 31 of the liquid crystal layer 30 are in a twist alignment as shown in FIGS. 10(a) and 10(b). That is, the liquid crystal molecules 31 are oriented generally parallel to the substrate surface (i.e., generally perpendicular to a direction normal to the liquid crystal layer 30). Liquid crystal molecules 31 near the first horizontal alignment film 14 and liquid crystal molecules 31 near the second horizontal alignment film 24 are oriented so as to form an angle of about 90°, and as a result, liquid crystal molecules 31 which are present in a center portion of the liquid crystal layer 30 in terms of the thickness direction are oriented generally parallel to the direction of extension of the slits 11a of the upper layer electrode 11 (direction d1). Therefore, the average orientation direction of the liquid crystal molecules 31 of the bulk liquid crystal is generally parallel to the direction of extension of the slits 11a (direction d1), i.e., forms an angle of about 45° to the transmission axes 15a and 25a of the first polarizer 15 and the second polarizer 25. In this transparent display state, each pixel of the liquid crystal display panel 200 has the highest light transmittance (i.e., a higher light transmittance than in any of the black display state and the white display state).

As described above, in the liquid crystal display panel 200 of the present embodiment, a longitudinal electric field is produced across the liquid crystal layer 30 when the liquid crystal display panel 200 is in the black display state, and a transverse electric field is produced across the liquid crystal layer 30 when the liquid crystal display panel 200 is in the white display state. Therefore, a torque produced by voltage application can affect the liquid crystal molecules 31 at both falling (transition from the white display state to the black display state) and rising (transition from the black display state to the white display state). Thus, excellent response characteristics can be achieved.

In the liquid crystal display panel 200 of the present embodiment, each pixel can exhibit not only the black display state and the white display state but also the transparent display state where no voltage is applied across the liquid crystal layer 30. Displaying of the background scene is performed in this transparent display state, whereby the quality of the see-through representation can be improved. As described above, the liquid crystal display panel 200 of the present embodiment is excellent in both response characteristics and display quality and therefore can be suitably used as a see-through display.

Note that each of the plurality of pixels of the liquid crystal display panel 200 can also exhibit "intermediate grayscale level display states" in which luminances corresponding to intermediate grayscale levels are represented, in addition to the black display state in which a luminance corresponding to the lowest grayscale level is represented, the white display state in which a luminance corresponding to the highest grayscale level is represented, and the transparent display state in which a see-through representation is realized. In the intermediate grayscale level display states, the intensity of the transverse electric field (fringe electric field) produced across the liquid crystal layer 30 is adjusted (for example, a potential of 0 V is applied to the counter electrode 21, and a potential of 7.5 V is applied to the lower layer electrode 12, while a potential of higher than 0 V and lower than 7.5 V is applied to the upper layer electrode 11), whereby a desired transmittance can be achieved. Note that the relationship of the potentials applied to the upper layer electrode 11 and the lower layer electrode 12 is, as a matter of course, not limited to the example described herein. For example, intermediate grayscale level display may be realized by fixing the potential applied to the upper layer electrode 11 while the potential applied to the lower layer electrode 12 is variable.

In the present embodiment, when the liquid crystal display panel 200 is in the transparent display state, the liquid crystal molecules 31 of the liquid crystal layer 30 are in a twist alignment. This enables to realize a still more distinctive (clearer) transparent display. This is because, in the twist alignment, liquid crystal molecules 31 in a plane parallel to the display surface are oriented in the same direction, and therefore, diffraction which is attributed to a difference in refractive index in the plane and diffraction by dark lines which are attributed to the display mode of the liquid crystal would not occur.

In the case where a display is performed such that information displayed on the liquid crystal display panel 200 is superimposed on the background scene, the pixels of a part of the display region in which the information is to be displayed exhibit the black display state, the white display state, or an intermediate grayscale level display state, while the pixels of the other part exhibit the transparent display state. Switching among these display states can be realized, for example, as described in the following paragraphs.

Driving circuits for common liquid crystal display devices include a 8-bit driver IC and are capable of generating output voltages for 256 grayscale levels (level 0 to level 255). In common liquid crystal display device, grayscale level 0 is assigned to the black display state, grayscale levels 1 to 254 are assigned to intermediate grayscale level display states, and grayscale level 255 is assigned to the white display state.

In the liquid crystal display panel 200 of the present embodiment, for example, grayscale level 0 is assigned to the transparent display state, grayscale level 1 is assigned to the black display state, grayscale levels 2 to 254 are assigned to intermediate grayscale level display states, and grayscale level 255 is assigned to the white display state, whereby switching among the black display state, the intermediate grayscale level display states, the white display state, and the transparent display state can be realized. Note that it is not necessary to assign the transparent display state to grayscale level 0. Whichever of the grayscale levels may be assigned to the transparent display state. Also in other cases than the 256 grayscale level representation described herein, a specific grayscale level may be likewise assigned to the transparent display state.

As described above, in the liquid crystal display panel 200 of the present embodiment, each pixel can exhibit the black display state, the white display state, and the transparent display state in a switchable manner. In conventional see-through displays, irrespective of their type (liquid crystal display device, PDLC display, organic EL display, etc.), a see-through representation is realized in either of the black display state and the white display state (i.e., a grayscale level for the black display state or the white display state is assigned to the see-through representation). Therefore, a see-through representation cannot be realized when the applied voltage is different from each of the applied voltage of the black display state and the applied voltage of the white display state. In comparison, in the liquid crystal display panel 200 of the present embodiment, each pixel can exhibit not only the black display state and the white display state but also the transparent display state in which the applied voltage is equal to none of the applied voltage of the black display state and the applied voltage of the white display state. Particularly, since the transparent display state is realized in the absence of an applied voltage across the liquid crystal layer, occurrence of a variation in the refractive index over a pixel in the transparent display state is prevented. Thus, scattering of light which is attributed to the variation in the refractive index can be prevented, and a viewer who views the background scene through the see-through display can be prevented from perceiving two images of the background scene.

In the foregoing, the display device of Embodiment 1 has been described, although various display panels can be used as the see-through panel 1. For example, the electrode structure of the see-through panel 1 is not limited to the configuration illustrated in FIG. 5 and FIG. 6. In the TFT substrate 10, not only the upper layer electrode 11 but also the lower layer electrode 12 may have slits. The slits of the lower layer electrode 12 can further improve the response characteristics and the light transmittance. Alternatively, the upper layer electrode 11 may be shaped such that a pair of comb-like electrodes mesh with each other. This pair of comb-like electrodes is capable of producing a transverse electric field.

The present invention is not limited to a liquid crystal display panel which operates in the above-described TN mode. A liquid crystal display panel including a liquid crystal layer which can be in a homogeneous alignment can be used. More specifically, in the liquid crystal display panel 200 shown in FIG. 5 and FIG. 6, a pretilt direction defined by one of the horizontal alignment films (horizontal alignment film 14) and a pretilt direction defined by the other horizontal alignment film 24 are parallel or antiparallel to each other such that the pretilt directions respectively defined by the horizontal alignment films 14, 24 are generally perpendicular to the direction of extension of the slits 11a of the upper layer electrode 11 (direction d1). Also in this case, the polarizers 15, 25 are in a crossed Nicols arrangement, and the transmission axes 15a, 25a of the polarizers 15, 25 are set so as to form an angle of about 45° to the pretilt directions defined by the horizontal alignment films 14, 24.

In this structure, a black display can be performed by producing a longitudinal electric field across the liquid crystal layer 30 such that the liquid crystal molecules 31 are oriented generally perpendicular to the substrate surface. A white display can be performed by producing a transverse electric field (fringe electric field) across the liquid crystal layer 30 such that the liquid crystal molecules 31 are oriented generally parallel to the substrate surface and generally perpendicular to the direction of extension of the slits 11a of the upper layer electrode 11 (direction d1), i.e., by using a transverse electric field to orient the liquid crystal molecules 31 so as to form an angle of about 45° to the transmission axes 15a, 25a of the polarizers 15, 25. The transparent display state, in which the highest light transmittance is achieved, can be realized when no voltage is applied across the liquid crystal layer 30 such that the liquid crystal molecules 31 are in a homogeneous alignment (the longitudinal direction of the liquid crystal molecules 31 forms an angle of about 45° to the transmission axes 15a, 25a of the polarizers 15, 25).

Alternatively, a liquid crystal display panel which includes a light-scattering liquid crystal, such as PDLC and PNLC, may be used as the see-through panel 1 and driven according to the field sequential method. Still alternatively, a liquid crystal display panel of an OCB (Optically Compensated Birefringence) mode which utilizes a bend alignment may be used as the see-through panel 1 and driven according to the field sequential method.

Note that, however, in either case, the display panel used as the see-through panel 1 is driven according to the field sequential method. In this case, the display timings of colored light on the see-through panel 1 and the emission timings of colored light from the rear side light source are synchronized, whereby the display on the see-through panel 1 can be suitably performed with high color reproducibility.

Embodiment 2

Hereinafter, a display device 102 of Embodiment 2 is described which includes a rear side panel 2A provided behind the see-through panel 1 instead of the lighting device 2 included in the display device 100 of Embodiment 1. Note that, in the display device 102 of the present embodiment, elements which are equivalent to those of the display device 100 of Embodiment 1 are designated by the same reference numerals, and detailed descriptions thereof are herein omitted.

As shown in FIG. 11, in the display device 102 of the present embodiment, the see-through panel 1 is provided on a side surface of the box-like case 8. The panel light source 3 is provided inside the case 8, for example, on the ceiling. The light source 3 is capable of irradiating the see-through panel 1 with red light R, green light G and blue light B, which are switched in a time division manner. Also in the present embodiment, the see-through panel 1 is driven according to the field sequential method with the use of the light source 3.

In the case 8, the rear side panel 2A is provided on the rear surface side of the see-through panel 1. The see-through panel 1 and the rear side panel 2A are typically arranged so as to overlap when viewed from the front surface side. In this structure, an image displayed by the rear side panel 2A is to be viewed through the see-through panel 1. The see-through panel 1 and the rear side panel 2A are typically spaced away from each other such that the panel surfaces are parallel to each other.

In the present embodiment, the rear side panel 2A is also driven according to the field sequential method. The rear side panel 2A emits red light R, green light G and blue light B in a time division manner in synchronization with the see-through panel 1 in the same way as in Embodiment 1.

On the rear surface side of the rear side panel 2A, a light source (not shown) for driving the rear side panel 2A according to the field sequential method is separately provided. The light source for the rear side panel 2A and the light source 3 for the see-through panel 1 are synchronized with each other so as not to concurrently emit light of different colors.

Note that, as shown in FIGS. 19(a) to 19(d), the frequency and period of emission of respective colored light are not necessarily identical between the light sources provided in both panels, but the light sources are synchronized with each other such that one of the light sources and the other light source at least do not concurrently emit light of different colors. Note that, in this specification, a display panel itself which includes a light source for driving according to the field sequential method is also referred to as "rear side light source".

FIG. 12(a) shows the emission timings of red light R, green light G and blue light B from the light source of the rear side panel 2A shown in FIG. 11 (i.e., the R display period, the G display period, and the B display period on the rear side panel 2A) and the response state D2 (transmittance) of the rear side panel 2A. FIG. 12(b) shows the emission timings of red light R, green light G and blue light B from the light source 3 of the see-through panel 1 (i.e., the R display period, the G display period, and the B display period on the see-through panel 1) and the response state D1 (transmittance) of the see-through panel 1. The horizontal axis of the graph represents time t.

As seen from FIGS. 12(a) and 12(b), in the example described herein, a white display is performed on the rear side panel 2A by transmitting all of red light R, green light G and blue light B, while on the see-through panel 1, a red display is performed in which red light R is selectively transmitted.

When both the see-through panel 1 and the rear side panel 2A are driven according to the field sequential method, the R display period, the G display period and the B display period can be synchronized between the rear side panel 2A and the see-through panel 1 as shown in FIGS. 12(a) and 12(b). So long as the display periods for respective colors are thus synchronized, a display with high color purity can be performed also when different displays are performed in both panels, such as when a white display is performed on the rear side panel 2A while a red display is performed on the see-through panel 1.

More specifically, as shown in FIG. 12(a), in the rear side panel 2A, to perform a white display, respective colored light are transmitted during the entirety of the R display period, the G display period and the B display period. Note that, however, in the R display period of the see-through panel 1, the synchronized rear side panel 2A performs a display with red light R. As a result, as shown in FIG. 12(c), an actually-viewed display on the see-through panel 1 (a synthetic display consisting of the display on the see-through panel 1 and the display on the rear side panel 2A) is performed in such a manner that color components other than red light are not mixed in. Note that, since the see-through panel 1 does not transmit light in the G display period and the B display period, green light G and blue light B emitted from the rear side panel 2A do not affect the display on the see-through panel 1. Therefore, on the see-through panel 1, a desirable display can be performed without deteriorating the color purity.

FIGS. 13(a) to 13(c) show a reference example where a color display is performed according to the field sequential method on the see-through panel 1 while a color display is performed on a rear side panel 2A' using a white light source and R, G, B color filters (see FIG. 14(a)). FIGS. 13(a) to 13(c) correspond to FIGS. 12(a) to 12(c).

Also in the case described herein, the rear side panel 2A' performs a white display, and the see-through panel 1 performs a red color display. In this case, as shown in FIG. 13(a), in the rear side panel 2A' of the reference example, in order to perform a white display, red light R, green light G and blue light B are emitted concurrently and continuously from a R sub-pixel, a G sub-pixel and a B sub-pixel. On the other hand, as shown in FIG. 13(b), the see-through panel 1 transmits red light R in the R display period but does not transmit green light G and blue light B in the G display period and the B display period.

In this case, as shown in FIG. 13(c), the color of the red color display on the see-through panel 1 is affected by the white display on the rear side panel 2A' and its purity deteriorates. This is because, in the R display period of the see-through panel 1, not only red light R from the R sub-pixel but also green light G and blue light B from the G sub-pixel and the B sub-pixel are emitted from the rear side panel 2A' toward the see-through panel 1. Therefore, the red color display on the see-through panel 1 to be viewed (the synthesis of the display on the see-through panel 1 in the R display period and the display on the rear side panel 2A') appears whitish so that the color purity deteriorates.

Note that, even when the rear side panel 2A uses a color filter and has a R sub-pixel, a G sub-pixel and a B sub-pixel, the operation of the rear side panel 2A is controlled so as to emit light of different colors in a time division manner, whereby the operation of the rear side panel 2A is synchronized with the display on the see-through panel 1. For example, the above-described rear side panel 2A may be configured such that a period during which only the R sub-pixel is driven for displaying the red component of a displayed image, a period during which only the G sub-pixel is driven for displaying the green component of the image, and a period during which only the B sub-pixel is driven for displaying the blue component of the image are provided in a time division manner in synchronization with the display periods of respective colored light on the see-through panel.

The rear side panel 2A may be a self-emitting display panel, such as an organic EL panel. Also in this case, light-emitting elements corresponding to respective colors of the rear side panel 2A are allowed to emit in a time division manner in synchronization with the display on the see-through panel 1, whereby the display on the see-through panel 1 can be suitably performed without decreasing the color purity.

FIGS. 14(a) and 14(b) show differences between the display actually viewed when the rear side panel 2A' is driven according to a color filter method (FIGS. 13(a) to 13(c)) and the display actually viewed when the rear side panel 2A is driven according to a synchronized field sequential method (FIGS. 12(a) to 12(c)), while the see-through panel 1 is driven according to the field sequential method. As illustrated in FIG. 14(a), when the rear side panel 2A' is driven according to a color filter method, a displayed image on the see-through panel 1 is not visually perceived by the viewer V1 as having intended colors in a region R1 extending over the rear side panel 2A'. This is because the color of the displayed image on the rear side panel 2A' is mixed in the color of the displayed image on the see-through panel 1. On the other hand, as illustrated in FIG. 14(b), when the rear side panel 2A is also driven according to a synchronized field sequential method, the displayed image I1 on the see-through panel 1 can be presented in intended colors to the viewer V1, irrespective of the displayed image on the rear side panel 2A.

Although in the above-described example the emission timings of colored light are synchronized between the see-through panel 1 and the rear side panel 2A that serves as a rear side light source placed at the rear side of the see-through panel 1, the see-through panel 1 and the rear side panel 2A may have various forms. For example, each of the see-through panel 1 and the rear side panel 2A may be a liquid crystal display panel which operates in the TN mode that has been previously described with reference to FIG. 5 to FIG. 10.

Note that, when a TN type or VA (vertical alignment) type liquid crystal display panel is used as the see-through panel 1 and the rear side panel 2A, each panel includes a front side polarizer and a rear side polarizer according to the display mode in some cases. For example, in a liquid crystal panel of the TN mode illustrated in FIG. 5 to FIG. 10, a pair of polarizers are provided in a crossed Nicols arrangement with a liquid crystal layer interposed therebetween. In this case, the respective polarizers are preferably arranged such that the polarization axis (transmission axis or absorption axis) of the rear side polarizer of the see-through panel 1 and the polarization axis (transmission axis or absorption axis) of the front side polarizer of the rear side panel 2A that is placed on the rear surface side of the see-through panel 1 have a parallel-Nicols relationship. Due to this arrangement, polarized light emitted from the rear side panel 2A is not absorbed by the rear side polarizer of the see-through panel 1, and hence, the display on the rear side panel 2A can be appropriately performed through the see-through panel 1.

The display device of the present embodiment is not limited to a configuration where the see-through panel 1 and the rear side panel 2A are attached to the case 8 as described above but may have various forms. For example, without being housed in the case 8, the see-through panel 1 and the rear side panel 2A may be arranged so as to at least partially overlap when seen from the viewer's side while a light source for the see-through panel is provided on the rear surface side of the see-through panel 1 and a light source for the rear side panel 2A is provided on the rear surface side of the rear side panel 2A. Also, the display device of the present embodiment is not limited to a configuration which includes a single see-through panel 1 and a single rear side panel 2A. A larger number of display panels may be used.

Figure 18:
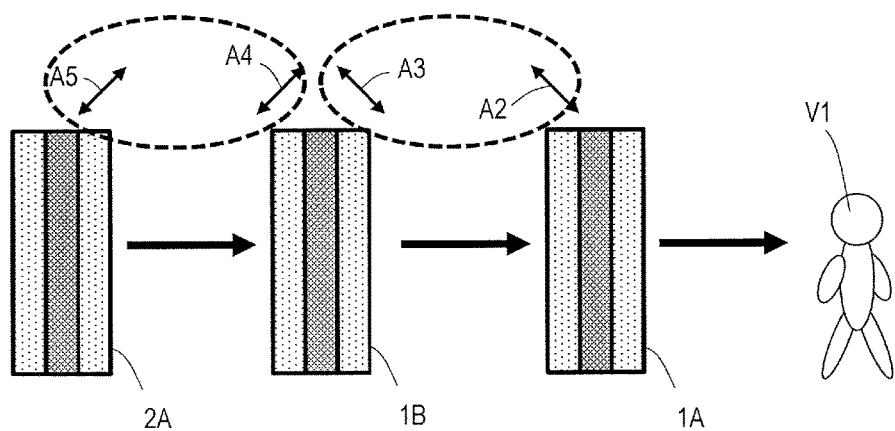
FIG. 18 A side view showing another configuration of Embodiment 1 of the present invention.

FIG. 18 shows a configuration where a first see-through panel 1A and a second see-through panel 1B are placed in front of the rear side panel 2A. The first see-through panel 1A, the second see-through panel 1B, and the rear side panel 2A are arranged so as to at least partially overlap when viewed from the viewer V1. Each of the first see-through panel 1A, the second see-through panel 1B, and the rear side panel 2A is a transmissive liquid crystal display panel. For example, it may be the above-described TN mode liquid crystal display panel.

Also in such a case where three or more display panels are thus used, they are in a parallel-Nicols arrangement such that, in two adjoining display panels, the transmission axes of two opposing polarizers are parallel to each other. That is, in the example shown in FIG. 18, the transmission axis (or absorption axis) A5 of the front side polarizer of the rear side panel 2A and the transmission axis (or absorption axis) A4 of the rear side polarizer of the second see-through panel 1B that is placed in front of the rear side panel 2A are parallel to each other. The transmission axis (or absorption axis) A3 of the front side polarizer of the second see-through panel 1B and the transmission axis (or absorption axis) A2 of the rear side polarizer of the first see-through panel 1A that is placed in front of the second see-through panel 1B are parallel to each other.

When each of the first see-through panel 1A, the second see-through panel 1B and the rear side panel 2A is a TN mode liquid crystal display panel, adjoining liquid crystal display panels may have opposite twist directions in the twist alignment. For example, in the liquid crystal layers of the rear side panel 2A and the first see-through panel 1A, a left-handed chiral agent may be used to realize a left-handed twist alignment, while in the liquid crystal layer of the second see-through panel 1B, a right-handed chiral agent may be used to realize a right-handed twist alignment. Alternatively, a right-handed chiral agent may be used in the liquid crystal layers of the rear side panel 2A and the first see-through panel 1A, while a left-handed chiral agent may be used in the liquid crystal layer of the second see-through panel 1B. In such a way, the directions in which the viewing angle characteristics are excellent can be the same among all of the panels, and therefore, the viewing angle characteristics in specific directions can be improved.

When a plurality of (particularly, three or more) liquid crystal display panels are thus arranged in an overlapping manner, it is preferred that each of the liquid crystal display panels has a high transmittance. To this end, as described above, performing a color display according to the field sequential method, without a color filter provided in each of the liquid crystal display panels, is preferred. Thereby, even when a plurality of liquid crystal display panels are used, a display with excellent transmittance and high display quality can be performed. Therefore, high-presence images that no one has experienced before can be presented with high quality; for example, more stereoscopic images can be presented to viewers.

In the case where a plurality of display panels are thus arranged in an overlapping manner, the display timings of colored light at the see-through panels 1A, 1B and the emission timings of colored light from the rear side panel 2A are synchronized, whereby the display on the see-through panels 1A, 1B can be desirably performed with high color reproducibility.

Embodiment 3

Figure 15:
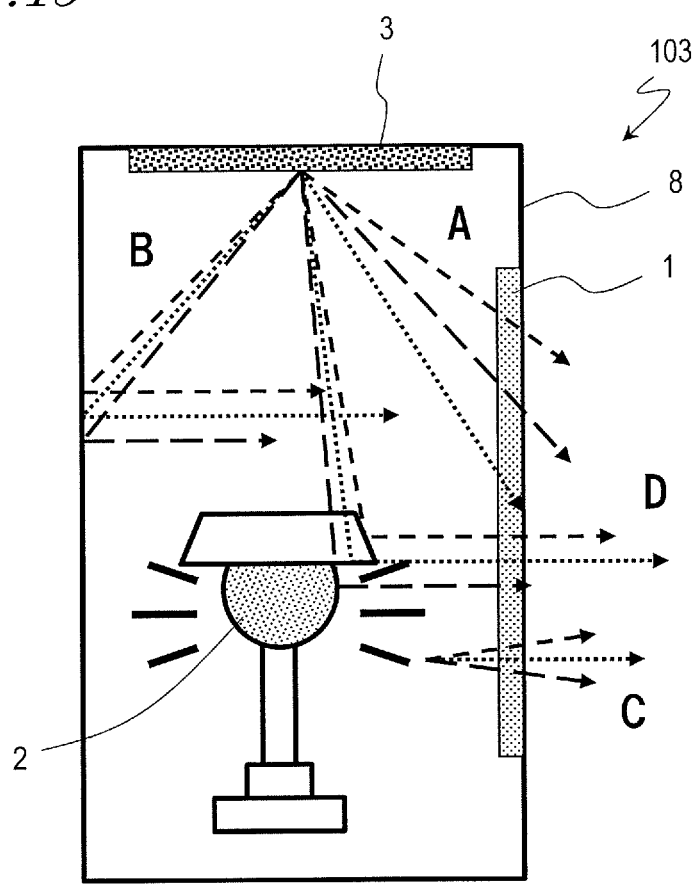
FIG. 15 A cross-sectional view schematically showing a display device according to Embodiment 3 of the present invention.

FIG. 15 is a diagram for illustrating a configuration of a display device 103 of Embodiment 3 which is capable of adjusting the intensity of light emitted from the lighting device 2 and the light source 3 in the display device 100 of Embodiment 1 shown in FIG. 1.

As shown in FIG. 15, light emitted from the panel light source 3 reaches the see-through panel 1 via various routes. After emitted from the light source 3, part of the light is reflected by an inner wall of the case 8 and travels toward the see-through panel 1 as illustrated by route B. Therefore, the inner wall of the case 8 is preferably white so that the light utilization efficiency can be improved. Note that light passing through the see-through panel 1 and going out of the case 8 includes light emitted from the lighting device 2.

The light emitted from the see-through panel 1 generally consists of light traveling along the four routes A to D described below.

Route A: Light emitted from the light source 3 and directly traveling to the see-through panel 1;

Route B: Light emitted from the light source 3, reflected by an inner wall of the case 8, and then traveling to the see-through panel 1;

Route C: Light emitted from the lighting device 2 and directly traveling to the see-through panel 1;

Route D: Light emitted from the light source 3, reflected by the lighting device 2, and then traveling to the see-through panel 1.

When viewed from the front surface side of the see-through panel 1, if the difference in brightness between a region where the lighting device 2 is present behind and a region where the lighting device 2 is not present behind is smaller, a displayed image has higher quality. Hereinafter, the amount of light emitted from the see-through panel 1 in the respective regions is discussed.

The amount of light in a region where the lighting device 2 is not present behind and the inner wall of the case 8 is viewable (Light Amount L8) can be regarded as the total of the amount of the light of route A (Light Amount A) and the amount of the light of route B (Light Amount B). This can be expressed as Light Amount L8=Light Amount A+Light Amount B.

Meanwhile, the amount of light in a region where the lighting device 2 is present behind (Light Amount L2) can be regarded as the total of the amount of the light of route A (Light Amount A), the amount of the light of route C (Light Amount C), and the amount of the light of route D (Light Amount D). This can be expressed as Light Amount L2=Light Amount A+Light Amount C+Light Amount D.

Thus, when the amount of light is equal between both of the above-described regions, Light Amount A+Light Amount B=Light Amount A+Light Amount C+Light Amount D holds. That is, it is preferred that Light Amount B=Light Amount C+Light Amount D holds.

Here, the inner walls of the case 8 have a high reflectance. For example, the inner walls can have a reflectance of about 96% by painting the inner walls white. Therefore, the ratio of Light Amount B to Light Amount A is relatively high. For example, when it is expressed as r1×Light Amount A (r1<1), r1 has a relatively large value.

On the other hand, as for light reflected by the lighting device 2 (the light of route D), the reflectance of the lighting device 2 is about 18%, i.e., relatively low. Note that although the reflectance of the lighting device 2 may vary depending on the properties (color, material, etc.) of the lighting device 2, the value of the standard reflectance (18%) is herein used as the average reflectance of the lighting device 2. The standard reflectance is widely known as the average reflectance across the entirety of an object in photography. The ratio of Light Amount D to Light Amount A is relatively low. For example, it can be expressed as r2×Light Amount A (r1>r2).

Thus, in general, Light Amount B>Light Amount D holds. Light Amount B of reflected light is smaller than Light Amount A as described above. That is, Light Amount A>Light Amount B holds.

Here, if the above-described relationship is applied to the above-described formula of the condition for making the amount of light uniform across the panel surface, Light Amount B=Light Amount C+Light Amount D, i.e., Light Amount C=Light Amount B−Light Amount D, then Light Amount C=Light Amount B−Light Amount D<Light Amount A−Light Amount D<Light Amount A is deduced. That is, it is understood that Light Amount C<Light Amount A is one of the conditions preferred for reducing the variation in brightness across the panel surface. Thus, in the present embodiment, the luminance of the light source 3 and the luminance of the lighting device 2 are appropriately adjusted such that the amount of light directly traveling from the light source 3 to the see-through panel 1 (Light Amount A) is larger than the amount of light directly traveling from the lighting device 2 to the see-through panel 1 (Light Amount C). More preferably, the luminance of the light source 3 and the luminance of the lighting device 2 are appropriately adjusted such that Light Amount C (the amount of light from the lighting device 2)=Light Amount B−Light Amount D holds.

Here, when the reflectance r1 of the inner walls of the case 8 is estimated to be 96% and the common reflectance (standard reflectance) r2 is estimated to be 18%, it is preferred that Light Amount C=(0.96−0.18)×Light Amount A=0.78×Light Amount A. Therefore, it is understood that the luminance of the lighting device 2 is preferably about 0.75 to 0.8 times the luminance of the light source 3.

As described above, the condition of Light Amount C<Light Amount A is preferred from the viewpoint of display on the see-through panel 1. However, for the purpose of illuminating a product inside the case 8 brighter, it is sometimes difficult to decrease Light Amount C. When the rear side light source 2 is driven according to the field sequential method in synchronization with the see-through panel 1, mixture of colors (whitish appearance) can be avoided. However, there is a probability that, when viewed from the front side, a difference in luminance occurs between a region where the rear side light source 2 is present behind and a region where the rear side light source 2 is not present behind. Thus, in another configuration of the present embodiment, the transmittance of the region where the rear side light source 2 is present behind and the transmittance of the region where the rear side light source 2 is not present behind may be adjusted at the see-through panel 1.

FIGS. 16(*a*) to 16(*c*) are diagrams for illustrating a configuration where, in a displayed image on the see-through panel 1, the grayscale level of the see-through panel 1 is adjusted in an image I2 of a region extending over the rear side light source 2 and in an image I8 of a region not extending over the rear side light source 2.

As shown in FIG. 16(*a*), the image displayed on the see-through panel 1 includes the image I2 of a region extending over the rear side light source 2 and the image I8 of a region not extending over the rear side light source 2 (i.e., the image I8 where the background scene is an inner wall of the case 8). Here, as for pixels for displaying the image I8, a display at grayscale levels as indicated by the image data, for example, is performed. Meanwhile, as for pixels for displaying the image I2, to order to reduce the influence of the rear side light source 2, a display is performed with lower grayscale levels than those of the image data. Note that, preferably, in a region where a transparent image I0 is displayed, the brightest transparent display is performed such that a product inside the case 8 is easily viewable.

FIG. 16(*b*) illustrates the response state (transmittance) D3 of the liquid crystal and the light that irradiates pixels in a region for displaying the image I8 in which the rear side light source 2 is not present behind. Here, the pixels are irradiated only with red light R from the light source 3. On the other hand, FIG. 16(*c*) illustrates the response state (transmittance) D4 of the liquid crystal and the light that irradiates pixels in a region for displaying the image I2 in which the rear side light source 2 is present behind. Here, the pixels are irradiated with red light R from the light source 3 and red light R from the rear side light source 2.

As seen from FIGS. 16(*b*) and 16(*c*), in the region for displaying the image I8, the intensity of red light R which irradiates the pixels is relatively small, while in the region for displaying the image I2, the intensity of red light R which irradiates the pixels is relatively large. In view of this, in order to make the brightness of the images in these regions equal, the response state D4 of the liquid crystal in the region for displaying the image I2 is lower than the response state D3 of the liquid crystal in the region for displaying the image I8. This enables the image I2 and the image I8 to be displayed as the image on the see-through panel 1 with equal luminance irrespective of whether or not the rear side light source 2 is present in the background scene. By thus adjusting the grayscale level in the see-through panel 1, the luminance can be more uniform across the surface, and a better appearance is achieved.

Note that, when the brightness of the rear side light source 2 is not sufficient, there is a probability that the amount of light reflected by the inner walls of the case 8, Light Amount B, is greater than the amount of light from the rear side light source 2, Light Amount C+Light Amount D. In this case, the grayscale levels in the region for displaying the image I8 (a region where the background scene is an inner wall of the case 8) may be higher than those in the region for displaying the image I2 (a region where the background scene is the rear side light source 2).

Embodiment 4

In the present embodiment, a configuration is described in which, in the display device 100 shown in FIG. 1, the lighting device (rear side light source) 2 that is placed behind the see-through panel 1 has a light emission timing for transparent display such that the background scene is more viewable through the see-through panel 1 in the transparent display state.

First, the role of the rear side light source 2 is described before describing a specific structure of the display device of the present embodiment. The rear side light source 2 has two roles. One is a light source function for display on the see-through panel 1. The other is an illuminator function for exhibition of a product inside the case 8 (e.g., the rear side light source itself) to viewers.

If the illuminator function for a product has precedence, there is a probability that the influence on the display on the see-through panel 1 increases. On the other hand, if the influence on the display on the see-through panel 1 is decreased, there is a probability that the illuminator function for a product deteriorates.

Particularly when the rear side light source 2 is also driven according to the field sequential method in synchronization with the see-through panel 1, emission of respective colored light is performed in a time division manner, and therefore, the total amount of light is likely to decrease. When the see-through panel 1 includes polarizers, the amount of light emitted through the see-through panel 1 is not more than about 40% of the original amount of light, and therefore, when viewed through the see-through panel 1, the product is likely to appear dark to viewers.

Figure 17:
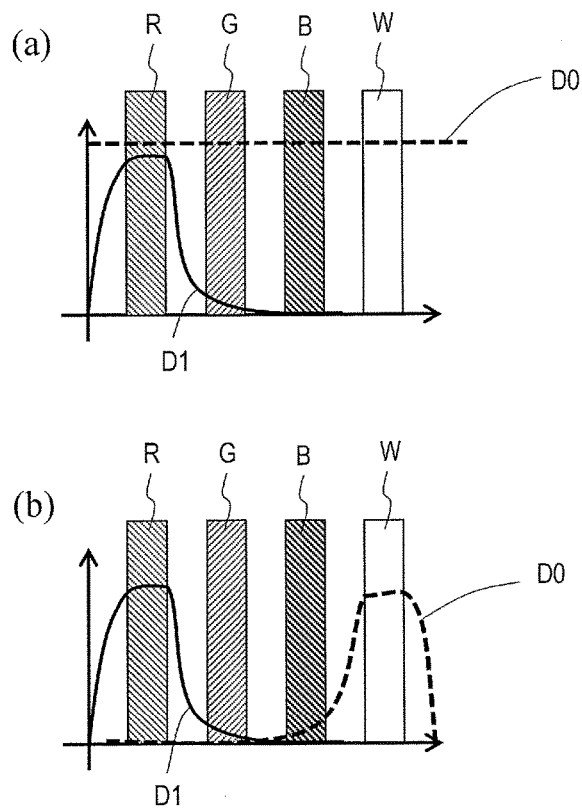
FIG. 17 Graphs illustrating the light emitted from the rear side light source and the state of response in an image display region and a transparent display region of a see-through panel in a display device according to Embodiment 4 of the present invention. (a) and (b) illustrate different configurations.

FIGS. 17(*a*) and 17(*b*) illustrate configurations which provide the timing of emitting white light W subsequent to red light R, green light G and blue light B from the rear side light source 2. FIGS. 17(*a*) and 17(*b*) illustrate different configurations. Here, the light source 3 for the see-through panel 1 (e.g., see FIG. 1) is also synchronized so as to emit light of the same color at the same timing as the colored light emission timing from the rear side light source 2 as illustrated in FIGS. 17(*a*) and 17(*b*). Note that emission of white light W may be performed using a white light source separately provided in the rear side light source 2 or may be performed by concurrently emitting red light R, green light G and blue light B.

First, the configuration illustrated in FIG. 17(*a*) is described. When the rear side light source 2 emits red light R, green light G, blue light B, and white light W as described above, an image displaying portion of the panel surface of the see-through panel 1 (here, a portion in which a red color display is performed) transmits light only at the timing where red light R is emitted as represented by the response state D1. Accordingly, a red image is displayed on the see-through panel 1.

Meanwhile, a portion of the see-through panel 1 which is in the transparent display state is always kept in a state where light is transmitted (e.g., a state where no voltage is applied) as represented by the response state D0. Note that the portion which is in the transparent display state may refer to, for example, a region which is outside an image display region that is a part of the see-through panel 1 and in which the background scene is always viewable through the see-through panel 1 (transparent display region).

With the above-described arrangement, the portion which is in the transparent display state is irradiated with red light R, green light G, blue light B, and white light W, and therefore, a product behind the see-through panel 1 can be exhibited with sufficient brightness even through the see-through panel 1. When white light W is emitted from the rear side light source 2, the response state D1 of the image displaying portion of the see-through panel 1 is set to the minimum (non-transmissive state), so that white light W would not affect the colors of an image on the see-through panel 1.

FIG. 17(*b*) is a graph for illustrating another example of the present embodiment. Also herein, the rear side light source 2 emits red light R, green light G, blue light B, and white light W at predetermined timings. The image displaying portion of the see-through panel 1 transmits light only at the timing where red light R is emitted as represented by the response state D1, so that a red image is displayed. Meanwhile, a portion of the see-through panel 1 which is in the transparent display state does not transmit light when red light R, green light G and blue light B are emitted from the rear side light source 2 but transmits light only when white light W is emitted as represented by the response state D0. Also in this way, in the portion which is in the transparent display state, the product can be exhibited relatively brightly through the see-through panel 1.

As described above, the rear side light source 2 has the period of emitting white light W, so that the brightness of the rear side light source 2 can be easily adjusted while reducing the influence on the brightness of the displayed image on the see-through panel 1. Thus, for example, as previously described in Embodiment 3, the rear side light source 2 emits red light R, green light G and blue light B with lower luminances than the light source 3 for the see-through panel 1, so that the uniformity in brightness of the image is secured, while a product inside the case 8 can be brightly illuminated by emission of white light W.

In the present embodiment, the frequency of colored light emission and the frequency of pixel driving in the rear side light source 2 are high (e.g., 200 Hz or higher), and therefore, even when the rear side light source 2 has the period of emitting white light W, viewers are unlikely to perceive flickers which are attributed to emission of white light W. Thus, the image on the see-through panel 1 and the background scene behind the see-through panel 1 can be exhibited to viewers without causing a sense of incongruity.

In the foregoing, an embodiment of the present invention has been described although various alternatives are possible. For example, in the above-described configuration, the light source 3 and the rear side light source, such as the lighting device 2 (or the rear side panel 2A), emit red light R, green light G and blue light B in a time division manner, although the present invention is not limited to this configuration. The light source 3 and the lighting device 2 may be configured to emit colored light other than red light R, green light G and blue light B in a time division manner. Also in this case, the emission timings of respective colored light are synchronized, whereby mixture of colors at the see-through panel 1 is reduced so that a display of high quality can be performed.

INDUSTRIAL APPLICABILITY

According to an embodiment of the present invention, a display device is provided in which a rear side light source, such as a lighting device and a display device, is provided on the rear surface side of a see-through panel. The display device of the embodiment of the present invention is used as, for example, a display device for information displays and digital signage or a showcase.

REFERENCE SIGNS LIST

1 see-through panel
2 lighting device (rear side light source)
2A rear side panel (rear side light source)
3 light source for panel
8 case
10 TFT substrate (rear substrate)
10*a* transparent substrate
11 first electrode (upper layer electrode)
11*a* slit
11*b* branch portion
12 second electrode (lower layer electrode)
13 insulating layer
14 first horizontal alignment film
15 first polarizer
15*a* transmission axis of first polarizer
16A first TFT
16B second TFT
16*d* drain electrode
16*g* gate electrode
16*s* source electrode
17 gate bus line
18 source bus line
20 counter substrate (front substrate)
20*a* transparent substrate
21 third electrode (counter substrate)
24 second horizontal alignment film
25 second polarizer
25*a* transmission axis of second polarizer
30 liquid crystal layer
31 liquid crystal molecules
100 display device
200 liquid crystal display panel
210 illuminator unit

The invention claimed is:
1. A display device, comprising:
a case;
a display panel on a first side of the case and capable of being in a transparent display state where a background scene is viewable through the display panel;

a panel light source on a second side of the case and that irradiates the display panel with colored light of a plurality of colors in a time division manner;

a rear side light source on a third side of the case or behind the display panel and that irradiates a rear surface side of the display panel, the rear side light source being capable of emitting colored light of a plurality of colors in a time division manner; and a control circuit that controls emission timings of the colored light from the panel light source and from the rear side light source, wherein the panel light source and the rear side light source are synchronized by the control circuit such that colored light of different colors are not emitted at a same timing.

2. The display device of claim 1, wherein the display panel does not have a color filter and is driven by the panel light source according to a field sequential driving method.

3. The display device of claim 1, wherein the panel light source and the rear side light source emit colored light of a same color at a same timing.

4. The display device of claim 1, wherein the rear side light source includes a lighting device.

5. The display device of claim 1, wherein the rear side light source includes a rear side display panel.

6. The display device of claim 1, wherein
the panel light source is provided on an inner wall of a surface on the second side of the case, and
the rear side light source is provided inside the case.

7. The display device of claim 6, wherein a reflectance of an inner wall of the case is greater than 18% that is a standard reflectance.

8. The display device of claim 1, wherein an amount of colored light emitted from the rear side light source toward the display panel is smaller than an amount of colored light emitted from the panel light source toward the display panel.

9. The display device of claim 1, wherein
when viewed in a direction normal to a panel surface of the display panel, a first region in which the display panel and the rear side light source overlap and a second region in which the display panel and the rear side light source do not overlap are defined over the display panel, and
when a same image is displayed in the first region and the second region, the display panel performs the display with different light transmittances.

10. The display device of claim 1, wherein colored light emitted from the panel light source for irradiation of the display panel and colored light emitted from the rear side light source include red light, green light and blue light.

11. The display device of claim 10, wherein colored light emitted from the panel light source for irradiation of the display panel and colored light emitted from the rear side light source further include white light.

12. The display device of claim 11, wherein during a period in which the rear side light source emits white light, an image display region of the display panel is in such a state that light is not transmitted therethrough while a transparent display region of the display panel is in such a state that light is transmitted therethrough.

13. The display device of claim 1, further comprising another display panel capable of being in a transparent display state where a background scene is viewable through the another display panel,
wherein the display panel, the rear side light source, and the another display panel are arranged so as to at least partially overlap when viewed in a direction normal to a panel surface of the display panel.

14. The display device of claim 1, wherein
the display panel includes a first substrate, a second substrate, and a liquid crystal layer between the first substrate and the second substrate,
the first substrate includes a first electrode and a second electrode which cooperates with the first electrode to produce a transverse electric field across the liquid crystal layer,
the second substrate includes a third electrode which is arranged so as to oppose the first electrode and the second electrode and which cooperates with the first electrode and the second electrode to produce a longitudinal electric field across the liquid crystal layer, and
the display panel is capable of exhibiting, in each pixel, a black display state where a black display is performed with a longitudinal electric field produced across the liquid crystal layer, a white display state where a white display is performed with a transverse electric field produced across the liquid crystal layer, and a transparent display state where a rear surface side of the display panel is viewable through the display panel with no voltage applied across the liquid crystal layer, in a switchable manner.

15. The display device of claim 14, wherein the liquid crystal layer is a twisted nematic (TN) type liquid crystal layer.

* * * * *